(12) United States Patent
Gilliam et al.

(10) Patent No.: US 11,670,789 B2
(45) Date of Patent: *Jun. 6, 2023

(54) ELECTROCHEMICAL CELL WITH GAP BETWEEN ELECTRODE AND MEMBRANE, AND METHODS TO USE AND MANUFACTURE THEREOF

(71) Applicant: Verdagy, Inc., Moss Landing, CA (US)

(72) Inventors: Ryan J. Gilliam, San Jose, CA (US); Thomas H. McWaid, Santa Cruz, CA (US)

(73) Assignee: Verdagy, Inc., Moss Landing, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/812,824

(22) Filed: Jul. 15, 2022

(65) Prior Publication Data
US 2023/0041096 A1    Feb. 9, 2023

Related U.S. Application Data

(63) Continuation of application No. 17/560,706, filed on Dec. 23, 2021, now Pat. No. 11,431,012.

(60) Provisional application No. 63/230,948, filed on Aug. 9, 2021.

(51) Int. Cl.
| | | |
|---|---|---|
| *C25B 9/19* | (2021.01) | |
| *C25B 9/63* | (2021.01) | |
| *C25B 13/02* | (2006.01) | |
| *H01M 8/0656* | (2016.01) | |
| *H01M 4/04* | (2006.01) | |
| *H01M 4/02* | (2006.01) | |

(52) U.S. Cl.
CPC ............ *H01M 8/0656* (2013.01); *C25B 9/19* (2021.01); *C25B 9/63* (2021.01); *C25B 13/02* (2013.01); *H01M 4/0438* (2013.01); *H01M 2004/027* (2013.01); *H01M 2004/028* (2013.01)

(58) Field of Classification Search
CPC .................................... C25B 1/04; C25B 9/73
See application file for complete search history.

(56) References Cited

U.S. PATENT DOCUMENTS

| | | |
|---|---|---|
| 4,315,810 A | 2/1982 | Kircher |
| 4,368,109 A | 1/1983 | Ford |
| 4,560,461 A | 12/1985 | Okazaki et al. |
| 4,588,483 A | 5/1986 | Woodard, Jr. et al. |
| 4,602,984 A | 7/1986 | Beaver et al. |
| 4,654,136 A | 3/1987 | Dang et al. |
| 4,687,558 A | 8/1987 | Justice et al. |
| 4,695,359 A | 9/1987 | Woodard, Jr. et al. |

(Continued)

FOREIGN PATENT DOCUMENTS

WO    WO-2016158455 A1    10/2016

OTHER PUBLICATIONS

"U.S. Appl. No. 17/560,706, Non Final Office Action dated Apr. 15, 2022", 9 pgs.

(Continued)

*Primary Examiner* — Harry D Wilkins, III
(74) *Attorney, Agent, or Firm* — Schwegman Lundberg & Woessner, P.A.

(57) ABSTRACT

Provided herein are electrochemical cell and/or electrolyzer configurations with membrane-electrode gap and optionally one or more spacers; and methods to use and manufacture the same.

21 Claims, 7 Drawing Sheets

(56) References Cited

U.S. PATENT DOCUMENTS

| | | |
|---|---|---|
| 6,894,296 B2 | 5/2005 | Su |
| 7,381,313 B2 | 6/2008 | Libby et al. |
| 8,636,880 B2 | 1/2014 | Stolberg |
| 9,340,882 B2 | 5/2016 | Tampucci et al. |
| 10,407,781 B2 | 9/2019 | Domon et al. |
| 10,883,181 B2 | 1/2021 | Takanami et al. |
| 10,968,526 B2 | 4/2021 | Iacopetti et al. |
| 11,431,012 B1 * | 8/2022 | Gilliam ............... C25B 13/02 |
| 2004/0151953 A1 | 8/2004 | Kirk et al. |
| 2010/0294653 A1 | 11/2010 | Kiefer et al. |
| 2015/0171455 A1 | 6/2015 | Mills |
| 2017/0130344 A1 | 5/2017 | Mitsushima et al. |
| 2019/0181461 A1 | 6/2019 | Weber et al. |

OTHER PUBLICATIONS

"U.S. Appl. No. 17/560,706, Notice of Allowance dated Jun. 15, 2022", 6 pgs.

"U.S. Appl. No. 17/560,706, Response filed Mar. 14, 2022 to Restriction Requirement dated Mar. 8, 2022", 6 pgs.

"U.S. Appl. No. 17/560,706, Response filed May 31, 2022 to Non Final Office Action dated Apr. 15, 2022", 11 pgs.

"U.S. Appl. No. 17/560,706, Restriction Requirement dated Mar. 8, 2022", 7 pgs.

"International Application Serial No. PCT/US2021/065107, International Search Report dated May 4, 2022", 4 pgs.

"International Application Serial No. PCT/US2021/065107, Invitation to Pay Additional Fees dated Mar. 1, 2022", 2 pgs.

"International Application Serial No. PCT/US2021/065107, Written Opinion dated May 4, 2022", 8 pgs.

Mandhane, J M, et al., "A flow pattern map for gas-liquid flow in horizontal pipes", International Journal of Multiphase Flow, (1974), 537-553.

Mcwaidthomas, H, et al., "Co-pending U.S. Appl. No. 17/557,467, filed Dec. 21, 2021".

U.S. Appl. No. 17/560,706, filed Dec. 23, 2021, Electrochemical Cell With Gap Between Electrode and Membrane, and Methods to Use and Manufacture Thereof.

* cited by examiner

ELECTROCHEMICAL CELL WITH GAP BETWEEN ELECTRODE AND MEMBRANE, AND METHODS TO USE AND MANUFACTURE THEREOF

CROSS-REFERENCE TO RELATED APPLICATIONS

This application is a continuation of and claims the benefit of priority of U.S. application Ser. No. 17/560,706, filed Dec. 23, 2021, which claims benefit of U.S. Provisional Application No. 63/230,948, filed Aug. 9, 2021, each of which is hereby incorporated by reference in its entirety in the present disclosure.

BACKGROUND

Production of hydrogen plays a key role in any industrialized society, since hydrogen is required for many essential chemical processes. As of 2019, roughly 70 million tons of hydrogen may have been produced annually worldwide for various uses, such as oil refining, and in the production of ammonia (through the Haber process) and methanol (through reduction of carbon monoxide), and also as a fuel in transportation.

A majority of hydrogen (~95%) may be produced from fossil fuels by steam reforming of natural gas, partial oxidation of methane, and coal gasification. Other methods of hydrogen production include biomass gasification, no $CO_2$ emissions methane pyrolysis, and electrolysis of water. Electrolysis consists of using electricity to split water into hydrogen and oxygen. All methods and systems are, however, generally more expensive than fossil-fuel based production methods and the fossil-fuel based methods are environmentally damaging. Therefore, there is a need for a cost competitive and an environmentally friendly hydrogen gas producing electrolysis system.

SUMMARY

Provided herein are methods and systems that relate to unique configurations of the electrochemical cells that are designed to carry out electrolysis processes, such as, e.g. hydrogen gas production in an ion exchange membrane (IEM) water electrolysis technology that may enable commercially compelling alternative to fossil fuels. The electrochemical cell configurations provided herein include unique configurations of electrode and membrane in the cell as well as various configurations of spacers in the cell that enable operation of the electrochemical cells at high current densities. Due to production at high current densities, a targeted production rate may be met with fewer cells, thereby reducing capital expenses and making electrolysis system a viable source for hydrogen gas production.

In one aspect, there is provided an electrochemical cell, comprising: an anode, a cathode, and a membrane, wherein the anode and the membrane and/or the cathode and the membrane are separated by a membrane-electrode gap of between about 0.2-2 mm. In some embodiments of the foregoing aspect, the anode and the cathode in the electrochemical cell are separated by a fixed gap wherein the fixed gap is between about 0.2-4 mm. In some embodiments of the foregoing aspect and embodiment, the membrane-electrode gap provides a path for electrolyte flow and/or gas release between the anode and the membrane and/or the cathode and the membrane, thereby reducing membrane damage due to high heat. In some embodiments of the foregoing aspect and embodiments, the anode and/or cathode is a planar electrode or an expanded metal or a mesh. In some embodiments of the foregoing aspect and embodiments, the membrane is an anion exchange membrane or a cation exchange membrane. In some embodiments of the foregoing aspect and embodiments, the electrochemical cell further comprises a baffle plate between the electrode and the electrode pan (e.g. anode pan or cathode pan). In some embodiments, the baffle plate provides electrolyte circulation and reduces heat damage to the membrane.

In some embodiments of the foregoing aspect and embodiments, the electrochemical cell further comprises one or more spacers in the membrane-electrode gap between the anode and the membrane and/or the cathode and the membrane. In some embodiments of the foregoing aspect and embodiments, the one or more spacers occupy the membrane-electrode gap completely or partially. In some embodiments of the foregoing aspect and embodiments, the one or more spacers are in mechanical contact with the anode and the membrane and/or the cathode and the membrane. In some embodiments of the foregoing aspect and embodiments, the one or more spacers are floating in the membrane-electrode gap. In some embodiments of the foregoing aspect and embodiments, the one or more spacers are woven material, knitted material, expanded mesh, or extruded mesh. In some embodiments of the foregoing aspect and embodiments, the one or more spacers are made of polypropylene (PP), polyethylene (PE), high density polyethylene (HDPE), polyethylene teraphthalate, polyether ether ketone (PEEK), nylon, polytetrafluoroethylene (PUT), perfluoroalkoxy (PFA), polychlorotrifluoroethylene, ethylene chlorotrifluoroethylene (ECTFE), polyvinylidene fluoride (PVDF), polyvinyl chloride (PVC), ethylene propylene, ethylene propylenediene, neoprene, or urethane. In some embodiments of the foregoing aspect and embodiments, the one or more spacers have a vertical feature connected to a horizontal feature wherein thickness of the vertical feature is more than thickness of the horizontal feature. In some embodiments of the foregoing aspect and embodiments, the vertical feature occupies the membrane-electrode gap completely or partially and the horizontal feature allows a path for electrolyte flow and/or gas release between the anode and the membrane and/or the cathode and the membrane. In some embodiments of the foregoing aspect and embodiments, the one or more spacers allow the membrane to be thermally isolated from any hot spots formed from the anode and/or the cathode.

In one aspect, there is provided one or more spacers between an electrode and a membrane, the spacer comprising: a vertical feature connected to a horizontal feature wherein thickness of the vertical feature is more than thickness of the horizontal feature, wherein the vertical feature provides a membrane-electrode gap between an electrode and a membrane, wherein the horizontal feature has gaps, and wherein the horizontal feature allows a path for electrolyte flow and/or gas release between the electrode and the membrane.

In some embodiments of the foregoing aspects and embodiments, the thickness of the vertical feature is between about 0.2-2 mm and the thickness of the horizontal feature is between about 0.1-1.5 mm.

In some embodiments of the foregoing aspects and embodiments, length of the one or more spacers is between about 0.75-1.5 m; width of the one or more spacers is between about 0.5-3 m; and/or the thickness of the one or more spacers is between about 0.2-2 mm.

In some embodiments of the foregoing aspects and embodiments, the number of one or more spacers is between 1-3.

In some embodiments of the foregoing aspects and embodiments, the electrochemical cell operates at high current densities of between about 300 mA/cm$^2$-6000 mA/cm$^2$.

In some embodiments of the foregoing aspects and embodiments, the electrochemical cell comprises anolyte and an oxygen gas flowing between the anode and the membrane and/or comprises catholyte and a hydrogen gas flowing between the cathode and the membrane. In some embodiments of the foregoing aspects and embodiments, the electrochemical cell comprises a high flow rate of the anolyte or the catholyte, of between about 200-10,000 kg/h. In some embodiments of the foregoing aspects and embodiments, the anolyte and/or the catholyte comprise an alkaline solution.

In some embodiments of the foregoing aspects and embodiments, the electrochemical cell is hydrogen gas producing electrochemical cell.

In some embodiments of the foregoing aspects and embodiments, the electrochemical cell is hydrogen gas producing electrochemical cell wherein the oxygen gas is produced at the anode and hydrogen gas is produced at the cathode.

In one aspect, there is provided an electrolyzer comprising multiplicity of individual aforementioned electrochemical cells and/or one or more spacers.

In one aspect, there is provided a method, comprising: positioning an electrode inside an electrochemical cell positioning a membrane on top of the electrode, and separating the electrode from the membrane by a membrane-electrode gap of between about 0.2-2 mm. In some embodiments of the foregoing aspect, an anode and a cathode in the electrochemical cell are separated by a fixed gap wherein the fixed gap is between about 0.2-4 mm. In some embodiments of the foregoing aspect and embodiments, the method further comprises providing a path for electrolyte flow and/or gas release through the membrane-electrode gap between the electrode and the membrane, thereby reducing membrane damage due to high heat.

In some embodiments of the foregoing aspect and embodiments, the electrode is an anode and/or a cathode. In some embodiments of the foregoing aspect and embodiments, the electrode is a planar electrode or an expanded metal or a mesh.

In some embodiments of the foregoing aspect and embodiments, the membrane is an anion exchange membrane or a cation exchange membrane.

In some embodiments of the foregoing aspect and embodiments, the method further comprises providing a baffle plate between the electrode and the electrode pan (e.g. anode pan or cathode pan) in the electrochemical cell. In some embodiments, the method further comprises providing electrolyte circulation through the baffle plate and reducing heat damage to the membrane.

In some embodiments of the foregoing aspect and embodiments, the method further comprises providing one or more spacers in the membrane-electrode gap between the electrode and the membrane. In some embodiments of the foregoing aspect and embodiments, the method further comprises occupying the membrane-electrode gap completely or partially with the one or more spacers. In some embodiments of the foregoing aspect and embodiments, the method further comprises providing mechanical contact of the one or more spacers with the electrode and/or the membrane. In some embodiments of the foregoing aspect and embodiments, the method further comprises floating the one or more spacers in the membrane-electrode gap. In some embodiments of the foregoing aspect and embodiments, the method further comprises providing the one or more spacers in form of woven material, knitted material, expanded mesh, extruded mesh or combinations thereof. In some embodiments of the foregoing aspect and embodiments, the one or more spacers are made of polypropylene (PP), polyethylene (PE), high density polyethylene (HDPE), polyethylene teraphthalate, polyether ether ketone (PEEK), nylon, polytetrafluoroethylene (PTFE), perfluoroalkoxy (PFA), polychlorotritluoroethylene, ethylene chlorotrifluoroethylene (ECTFE), polyvinylidene fluoride (PVDF), polyvinyl chloride (PVC), ethylene propylene, ethylene propylenediene, neoprene, or urethane.

In some embodiments of the foregoing aspect and embodiments, the method further comprises providing the one or more spacers with a vertical feature connected to a horizontal feature wherein thickness of the vertical feature is more than thickness of the horizontal feature. In some embodiments of the foregoing aspect and embodiments, the method further comprises occupying the membrane-electrode gap completely or partially with the vertical feature and allowing a path for electrolyte flow and/or gas release through the horizontal feature between the electrode and the membrane.

In some embodiments of the foregoing aspect and embodiments, the method further comprises using the one or more spacers to allow the membrane to be thermally isolated from any hot spots formed from the electrode.

In some embodiments of the foregoing aspect and embodiments, the method further comprises providing thickness of the vertical feature to be between about 0.2-2 mm and the thickness of the horizontal feature to be between about 0.1-1.5 mm.

In some embodiments of the foregoing aspect and embodiments, the method further comprises providing length of the one or more spacers to be between about 0.75-1.5 m; width of the one or more spacers to be between about 0.5-3 m; and/or the thickness of the one or more spacers to be between about 0.2-2 mm.

In some embodiments of the foregoing aspect and embodiments, the method further comprises providing number of one or more spacers to be between 1-3.

In some embodiments of the foregoing aspect and embodiments, the method further comprises operating the electrochemical cell under a high flow rate of anolyte or catholyte, respectively, of between about 200-10,000 kg/h. In some embodiments of the foregoing aspect and embodiments, the method further comprises operating the electrochemical cell at high current densities of between about 300 mA/cm$^2$-6000 mA/cm$^2$.

In some embodiments of the foregoing aspect and embodiments, the electrochemical cell is hydrogen gas producing cell.

In some embodiments of the foregoing aspect and embodiments, the method further comprises preventing membrane damage due to high local temperatures by providing high flow rate of the electrolyte and/or the gas release through the membrane-electrode gap; high shear rate to remove the gas at the electrode; no or minimal mechanical contact of the membrane and the electrode; and cooling of the membrane.

In one aspect, there is provided a process for manufacturing an electrochemical cell, comprising: positioning an electrode inside an electrochemical cell; positioning a membrane on top of the electrode, and providing a membrane-electrode gap between the electrode and the membrane wherein the membrane-electrode gap is between about 0.2-2 mm. In some embodiments of the foregoing aspect and embodiments, the process further comprises providing one or more spacers in the membrane-electrode gap. In some embodiments of the foregoing aspect and embodiments, the process further comprises providing a fixed gap between an anode and a cathode in the electrochemical cell wherein the fixed gap is between about 0.2-4 mm. In some embodiments of the foregoing aspect and embodiments, the process further comprises providing a baffle plate between the electrode and the electrode pan (e.g. anode pan or cathode pan) in the electrochemical cell. In some embodiments, the baffle plate provides electrolyte circulation and reduces heat damage to the membrane.

In one aspect, there is provided a process for assembling an electrochemical cell, comprising:

assembling an individual electrochemical cell by positioning an anode inside an electrochemical cell; positioning a membrane on top of the anode; providing a membrane-electrode gap between the anode and the membrane wherein the membrane-electrode gap is between about 0.2-2 mm; positioning a cathode on top of the membrane; and providing a zero gap between the cathode and the membrane; or assembling an individual electrochemical cell by positioning an anode inside an electrochemical cell; positioning a membrane on top of the anode; providing a zero gap between the anode and the membrane; positioning a cathode on top of the membrane; and providing a membrane-electrode gap between the cathode and the membrane wherein the membrane-electrode gap is between about 0.2-2 mm; or assembling an individual electrochemical cell by positioning an anode inside an electrochemical cell; positioning a membrane on top of the anode; providing a membrane-electrode gap between the anode and the membrane wherein the membrane-electrode gap is between about 0.2-2 mm; positioning a cathode on top of the membrane; and providing a membrane-electrode gap between the cathode and the membrane wherein the membrane-electrode gap is between about 0.2-2 mm; and supplying the electrochemical cell with feeders for a cell current and an electrolysis feedstock.

In some embodiments of the aforementioned aspect, the electrochemical cell is hydrogen gas producing cell. In some embodiments of the foregoing aspect and embodiments, the process further comprises providing a baffle plate between the electrode and the electrode pan (e.g. anode pan or cathode pan) in the electrochemical cell. In some embodiments, the baffle plate provides electrolyte circulation and reduces heat damage to the membrane.

In one aspect, there is provided a process for assembling an electrolyzer, comprising: assembling aforementioned individual electrochemical cells; and placing a plurality of the assembled electrochemical cells side by side in a stack and bracing them together so as to sustain electrical contact between the electrochemical cells.

BRIEF DESCRIPTION OF THE DRAWINGS

The novel features of the invention are set forth with particularity in the appended claims. A better understanding of the features and advantages of the present invention may be obtained by reference to the following detailed description that sets forth illustrative embodiments, in which the principles of the invention are utilized, and the accompanying drawings of which:

DETAILED DESCRIPTION

Figure 1:
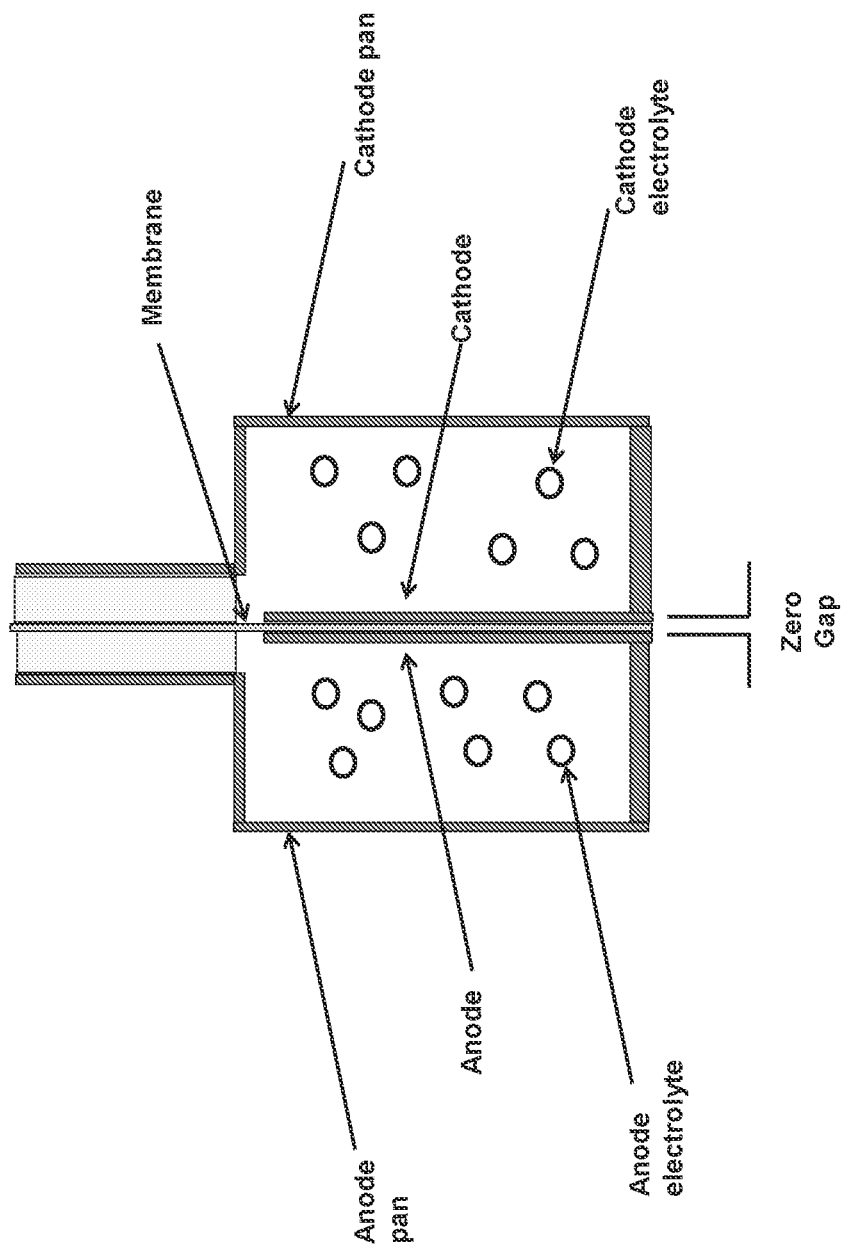
FIG. 1 illustrates some embodiments related to an electrochemical cell with zero gap.

Provided herein are unique spacers and electrochemical cells, and methods to use and manufacture the same; designed to carry out electrolysis processes, such as e.g. hydrogen gas production at high current densities using ion exchange membrane (IEM), such as e.g. anion exchange membrane (AEM) alkaline water electrolysis technology.

Typically, commercial alkaline water electrolysis cells may operate at 100-400 $mA/cm^2$. However, Applicants have designed unique electrochemical cells and its components that can dynamically operate at high current densities so that operators may meet their targeted production rate with fewer cells, thereby reducing capital expenses. Moreover, the cell's high range of operational current densities may provide operators with a large turndown ratio, enabling them to maximize production when power prices are low, and reduce power consumption when power prices are high.

Before the present invention is described in greater detail, it is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

Certain ranges that are presented herein with numerical values may be construed as "about" numeticals. The "about" is to provide literal support for the exact number that it precedes, as well as a number that is near to or approximately the number that the term precedes. In determining whether a number is near to or approximately a specifically recited number, the near or approximating unrequited number may be a number, which, in the context in which it is presented, provides the substantial equivalent of the specifically recited number.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, representative illustrative methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

It is noted that, as used herein and in the appended claims, the singular forms "a," "an," and "the" include plural references unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

Electrochemical Cell with Membrane-Electrode Gap(s), Fixed Gap and Spacer(s)

The operation of the electrochemical cells at high current densities, as stated earlier, can result in significant challenges, such as, but not limited to, large amount of heat generated in the cell, significant temperature and pressure fluctuations, membrane erosion or fatigue, and/or high flow rates of the electrolytes to combat Joule heating due to current flow.

In the electrochemical cells producing large amount of gas at high current densities, the gas/liquid mixture may have a lower specific heat, a lower density and/or a lower thermal conductivity than the liquid electrolyte. The heat removal efficiency may be reduced as the gas hold up increases. Local temperatures may potentially rise quickly if a gas pocket masks a region of the electrode. If a significant region of the electrode is masked, the unmasked region may have to work harder, increasing the local Joule heating. Local hot spots thus developed can damage the membrane. As the current density is increased in the cell, power dissipation may also rise dramatically. Large spatial and/or temporal temperature fluctuations can damage the membrane.

Therefore, accommodating high current density operation of the electrochemical cells, such as e.g. hydrogen gas generating cell, may require features in the cell that effectively remove a significant amount of heat from the cell; avoid membrane damaging hot spots and efficient current conduction through the cell; avoid large temperature variations of the electrolyte along the height of the cell; avoid masking a significant fraction of the nominal active area with gas; avoid formation of a stagnant gas pocket that may result in localized drying out of the membrane; and/or avoid significant pressure fluctuations due to slug or plug flow at the cell outlets.

Applicants have conducted simulation studies (described in Examples herein) and have found that at high current densities, resistance of the membrane such as, anion exchange membrane causes it to generate a significant amount of heat. Therefore, if the heat at the membrane is not effectively removed, it may be the highest temperature spot of the cell resulting in significant membrane damage.

Provided herein are unique configurations of the electrochemical cells that facilitate one or more of the aforementioned features. In some embodiments, the design of the electrochemical cells as provided herein insures that there is efficient path for solution and gas flow between the electrode (cathode and/or anode) and the membrane to effectively remove the heat generated around the membrane.

FIG. 1 illustrates an electrochemical cell with no gap or zero gap between the electrode and the membrane. As is evident in FIG. 1, in the electrochemical cell, there is an anode pan that houses an anode and an anode electrolyte. There is a cathode pan that houses a cathode and a cathode electrolyte and the anode pan and the cathode pan are separated by one or more diaphragms, membrane electrode assemblies (MEA) or ion exchange membranes (IEM). In this zero gap configuration, the electrode is positioned adjacent to the diaphragm or the membrane so that there is no gap between the electrode and the diaphragm or the membrane. While the zero gap design is effective in reducing solution resistance and reducing the operating voltage of the cell, the zero gap design is highly ineffective in facilitating solution and/or gas flow near the membrane e.g. at high current densities resulting in over heating of the cell and the damage of the membranes.

Provided herein are the electrochemical cells that comprise a membrane-electrode gap between the electrode and the membrane; one or more spacers in the membrane-electrode gaps in the electrochemical cells; the electrolyzers containing the same; and the methods to form, use and manufacture thereof. In one aspect, there are provided electrochemical cells comprising an anode, a cathode, and a membrane, wherein the anode and the membrane and/or the cathode and the membrane are separated by a membrane-electrode gap. The "membrane-electrode gap" as used herein is the distance or the gap between the electrode i.e. anode and/or cathode, and the membrane.

The electrochemical cells that comprise the aforementioned membrane-electrode gap between the electrode and the membrane further comprise a fixed gap between the anode and the cathode. The "fixed gap" as used herein corresponds to distance between the anode and the cathode in the cell minus the thickness of the membrane between the anode and the cathode provided that the distance between the anode and the cathode is greater than the thickness of the membrane. The fixed gap may be the membrane-electrode gap between the anode and the membrane (if there is zero gap between the cathode and the membrane), or the membrane-electrode gap between the cathode and the membrane (if there is zero gap between the anode and the membrane), or both the sum of the membrane-electrode gap between the anode and the membrane and the membrane-electrode gap between the cathode and the membrane. The fixed gap may be an electrolyte-filled gap between at least one electrode and the membrane. With the fixed gap structure, the electrodes may be relatively rigid, and the thickness of the fixed gap may be determined by the distance between the two relatively rigid electrodes. In some embodiments, the anode and/or cathode is a planar electrode or an expanded metal or a mesh. In an illustrative embodiment, various configurations of the electrochemical cells are shown in FIG. 2.

Figure 2:
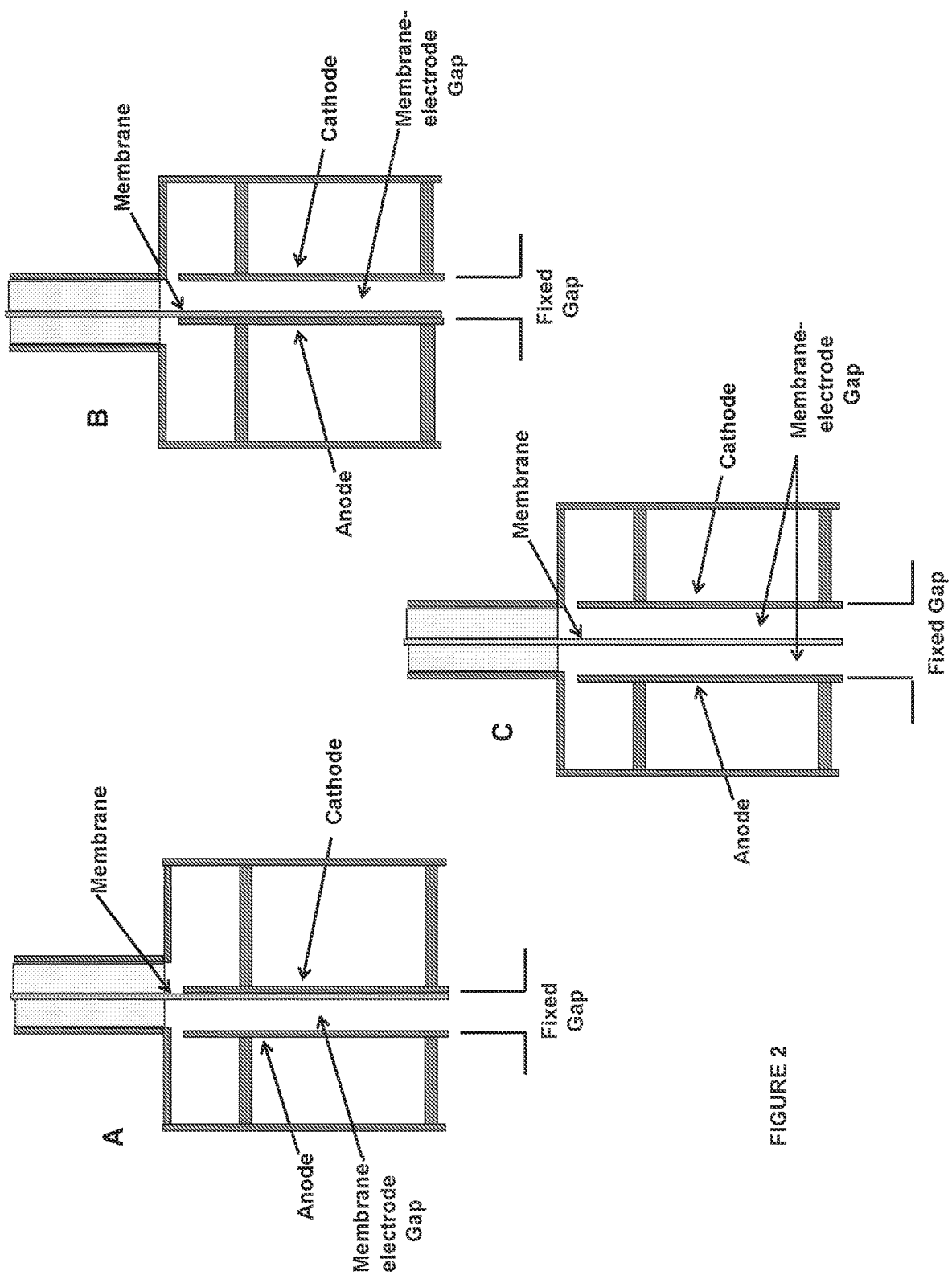
FIG. 2 illustrates some embodiments related to the electrochemical cell with the membrane-electrode gap.

In some embodiments, as illustrated in configuration A of FIG. 2, there is provided an electrochemical cell comprising the anode, the cathode, and the membrane, wherein the anode and the membrane are separated by the membrane-electrode gap. In the aforementioned embodiment, in some embodiments, the cathode and the membrane are separated by the zero gap. In some embodiments, as illustrated in configuration B of FIG. 2, there is provided an electrochemical cell comprising the anode, the cathode, and the membrane, wherein the cathode and the membrane are separated by the membrane-electrode gap. In the aforementioned embodiment, in some embodiments, the anode and the membrane are separated by the zero gap. In some embodiments, as illustrated in configuration C of FIG. 2, there is provided an electrochemical cell comprising the anode, the cathode, and the membrane, wherein the anode and the membrane are separated by the membrane-electrode gap and the cathode and the membrane are separated by the membrane-electrode gap. In all the three configurations A, B, and C in FIG. 2, the distance between the anode and the cathode minus the thickness of the membrane is shown as the fixed gap. Any of these configurations can be employed in order to achieve the benefits listed above.

The anode and/or the cathode compartments may further comprise components, such as a collection system, such as manifold and outlet tube that collect the gas and the liquid and flow them out of the cell; and/or baffle plate for effective circulation of the electrolyte in the cell, as described in U.S. Provisional Application No. 63/195,520, filed on Jun. 1, 2021, which is incorporated herein by reference in its entirety in the present disclosure. The baffle plate has also been further described herein. The anode and/or the cathode compartments may further comprise components, such as a weld and ribs for current distribution, as described in U.S. Provisional Application No. 63/195,531, filed on Jun. 1, 2021, which is incorporated herein by reference in its entirety in the present disclosure.

The membrane is an ion exchange membrane (IEM) e.g. an anion exchange membrane (AEM), a cation exchange membrane (CEM), or both depending on the desired reactions at the anode and the cathode. In between these components, various spacer components may be provided in the membrane-electrode gap(s), e.g. the AEM from the anode and/or the AEM from the cathode, the CEM from the cathode and/or AEM from the CEM as well as provide mechanical integrity to the membranes (described further herein below). In addition to these components, individual gaskets or gasket tape may be provided in between and along the outer perimeter of the components to seal the compartments from fluid leakage.

All the components described above may be aligned parallel to each other and optional peripheral bolting may be provided to stack them together in the electrochemical cell. In filter press configuration, no peripheral bolting may be required. In a stack of electrochemical cells, the anode of one electrochemical cell is in contact with the cathode of the adjacent electrochemical cell. The current passes through the stack of electrochemical cells during operation.

In some embodiments, the membrane-electrode gap between the anode and the membrane and/or the cathode and the membrane is between about 0.2-2 mm; or between about 0.2-1.8 mm; or between about 0.2-1.5 mm; or between about 0.2-1.3 mm; or between about 0.2-1 mm; or between about 0.2-0.8 mm; or between about 0.2-0.5 mm; or between about 0.5-2 mm; or between about 0.5-1.8 mm; or between about 0.5-1.5 mm; or between about 0.5-1.3 mm; or between about 0.5-1 mm; or between about 0.5-0.8 mm; or between about 0.8-2 mm; or between about 0.8-1.8 mm; or between about 0.8-1.5 mm; or between about 0.8-1.3 mm; or between about 0.8-1 mm; or between about 1-2 mm; or between about 1-1.8 mm; or between about 1-1.5 mm; or between about 1-1.3 mm; or between about 1.3-2 mm; or between about 1.3-1.81 mm; or between about 1.3-1.5 mm; or between about 1.5-2 mm; or between about 1.5-4.8 mm; or between about 1.8-2 mm; or about 0.8 mm; or about 1 mm; or about 0.5 mm; or 0.8 mm.

In some embodiments, the fixed gap between the anode and the cathode is between about 0.2-4 mm; or between about 0.2-3.5 mm; or between about 0.2-3 mm; or between about 0.2-2.5 mm; or between about 0.2-2 mm; or between about 0.2-1.5 mm; or between about 0.2-1 mm; or between about 0.2-0.5 mm; or between about 0.5-4 mm; or between about 0.5-3.5 mm; or between about 0.5-3 mm; or between about 0.5-2.5 mm; or between about 0.5-2 mm; or between about 0.5-1.5 mm; or between about 0.5-1 mm; or between about 1-4 mm; or between about 1-3.5 mm; or between about 1-3 mm; or between about 1-2.5 mm; or between about 1-2 mm; or between about 1-1.5 mm; or between about 1.5-4 mm; or between about 1.5-3.5 mm; or between about 1.5-3 mm; or between about 1.5-2.5 mm; or between about 1.5-2 mm; or between about 2-4 mm; or between about 2-3.5 mm; or between about 2-3 mm; or between about 2-2.5 mm; or between about 2.5-4 mm; or between about 2.5-3.5 mm; or between about 2.5-3 mm; or between about 3-4 mm; or between about 3.5-4 mm.

In some embodiments, the membrane-electrode and/or the fixed gap provides a path for the electrolyte flow and/or the gas release between the anode and the membrane and/or the cathode and the membrane, thereby reducing membrane damage due to high heat.

In some embodiments, there are provided electrochemical cells comprising an anode, a cathode, a membrane, and one or more spacers, wherein the anode and the membrane and/or the cathode and the membrane are separated by a membrane-electrode gap, and the one or more spacers are in the membrane-electrode gap(s). In some embodiments, the one or more spacers placed between the electrode (the anode or the cathode) and the membrane ensure that the membrane-electrode gap(s) remains fixed and that the membrane may not come into mechanical contact with the electrode which may lead to potential hot spots and the membrane damage. In some embodiments, the presence of the one or more spacers in the membrane-electrode gap(s) may obviate the need for mattress or fly net next to the membrane, and offer a least restrictive flow adjacent to the membranes. Unimpeded liquid and gas flow may map to enhanced thermal performance, and minimal gas masking.

The one or two spacers provided herein may allow unimpeded flow of liquid and gas; may be made of soft material that may not puncture or wear down the membrane; and/or may be thin and compatible with alkaline solutions, such as e.g. KOH at high temperature, e.g. 90° C.

Figure 3:
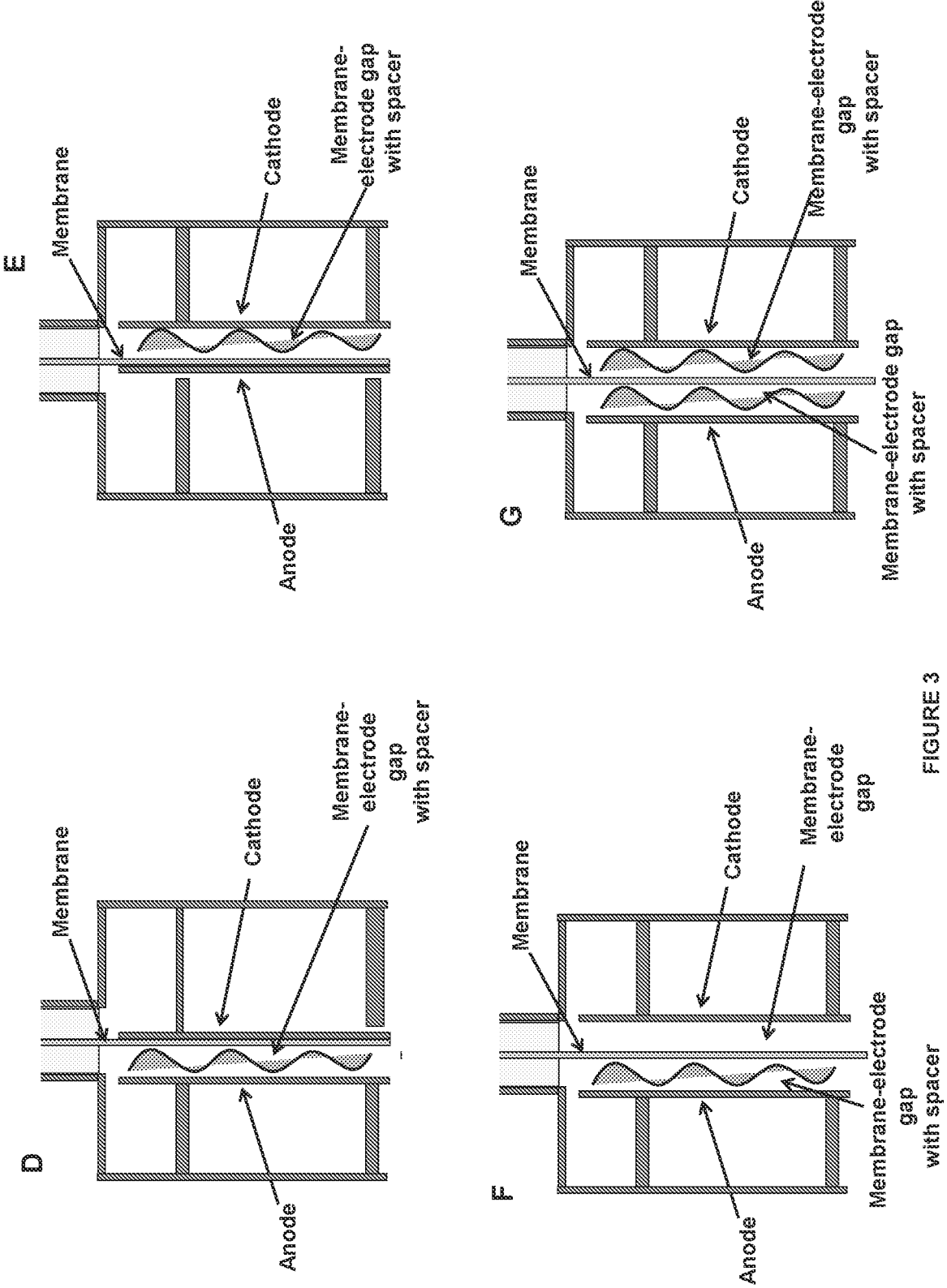
FIG. 3 illustrates some embodiments related to the electrochemical cell with the membrane-electrode gap and the one or more spacers positioned in the membrane-electrode gap.

Illustrated in FIG. 3 are various configurations of the electrochemical cells with membrane-electrode gaps and fixed gaps, and the one or more spacers placed in the membrane-electrode gaps. For example, configuration D in FIG. 3, illustrates an electrochemical cell with a membrane-electrode gap between the anode and the membrane and a spacer placed in the membrane-electrode gap. Accordingly, in some embodiments there are provided electrochemical cells comprising an anode, a cathode, a membrane, and one or more spacers, wherein the anode and the membrane are separated by a membrane-electrode gap, and the one or more spacers are in the membrane-electrode gap. In the aforementioned embodiment, in some embodiments, the cathode and the membrane are separated by the zero gap.

The configuration E in FIG. 3, illustrates an electrochemical cell with a membrane-electrode gap between the cathode and the membrane and a spacer placed in the membrane-electrode gap. Accordingly, in some embodiments there are provided electrochemical cells comprising an anode, a cathode, a membrane, and one or more spacers, wherein the cathode and the membrane are separated by a membrane-electrode gap, and the one or more spacers are in the membrane-electrode gap. In the aforementioned embodiment, in some embodiments, the anode and the membrane are separated by the zero gap.

The configuration F in FIG. 3, illustrates an electrochemical cell with a membrane-electrode gap between the anode and the membrane, a membrane-electrode gap between the cathode and the membrane, and a spacer placed in the membrane-electrode gap between the anode and the membrane. Accordingly, in some embodiments there are provided electrochemical cells comprising an anode, a cathode, a membrane, and one or more spacers, wherein the anode and the membrane are separated by a membrane-electrode gap and the one or more spacers are in the membrane-electrode gap, and wherein the cathode and the membrane are separated by a membrane-electrode gap (hut no spacer in the membrane-electrode gap).

In some embodiments there are provided electrochemical cells comprising an anode, a cathode, a membrane, and one or more spacers, wherein the cathode and the membrane are separated by a membrane-electrode gap and the one or more spacers are in the membrane-electrode gap, and wherein the anode and the membrane are separated by a membrane-electrode gap (but no spacer in the membrane-electrode gap). The aforementioned embodiment is not shown in the figures but would be a similar configuration as configuration F in FIG. 3.

The configuration G in FIG. 3, illustrates an electrochemical cell with a membrane-electrode gap between the anode and the membrane, a membrane-electrode gap between the cathode and the membrane, a spacer placed in the membrane-electrode gap between the anode and the membrane, and a spacer placed in the membrane-electrode gap between the cathode and the membrane. Accordingly, in some embodiments there are provided electrochemical cells comprising an anode, a cathode, a membrane, and one or more spacers, wherein the anode and the membrane are separated by a membrane-electrode gap and the one or more spacers are in the membrane-electrode gap, and wherein the cathode and the membrane are separated by a membrane-electrode gap and the one or more spacers are in the membrane-electrode gap. In some embodiments, the one or more spacers between the anode and the membrane are same or different from the one or more spacers between the cathode and the membrane.

Figure 4:
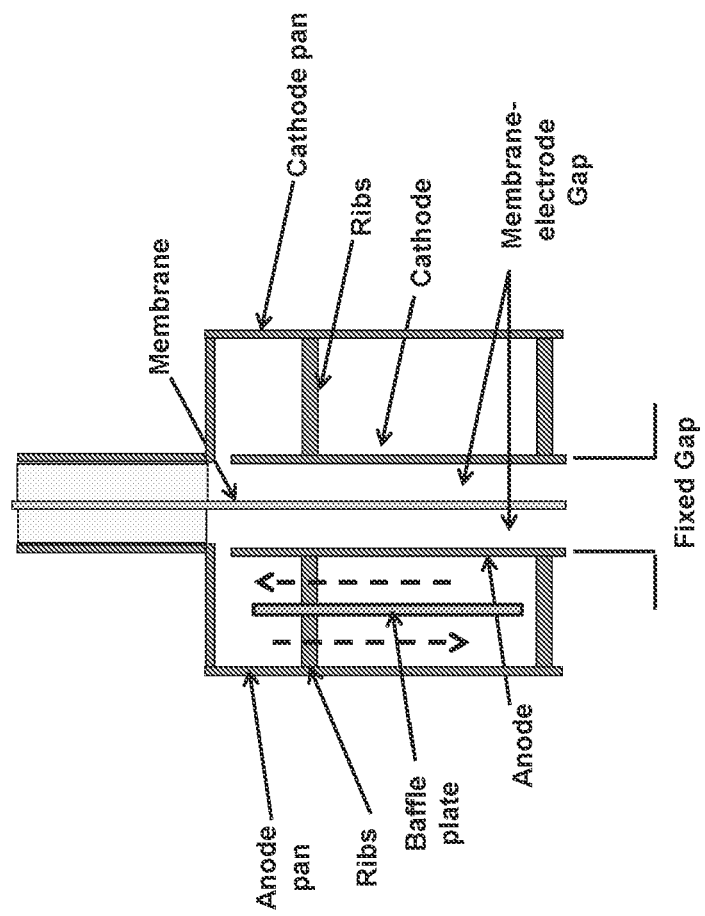
FIG. 4 illustrates some embodiments related to the electrochemical cell with the membrane-electrode gap and a baffle plate located in the anode compartment.

In some embodiments the electrochemical cells described herein (for example, the cells described above and illustrated in FIGS. 2 and 3) further comprise a baffle plate located in the electrode pan assembly behind the electrode or located between the electrode and the electrode pan. An illustration of the baffle plate with respect to the membrane-electrode gap is as shown in FIG. 4 where there is the membrane-electrode gap between the anode and the membrane and the cathode and the membrane and the baffle plate is suspended or located behind the anode between the anode and the anode pan. It is to be understood that the baffle plate may be present in the anode compartment, in the cathode compartment or both. Also, the baffle plate may be present in the electrochemical cell with the membrane-electrode gap between the anode and the membrane, the membrane-electrode gap between the cathode and the membrane, or both, with or without the spacers. All of such configurations of the electrochemical cell are well within the scope of the present disclosure.

The baffle plate may be fitted on one or more ribs (ribs are shown in FIG. 4) present in the anode pan assembly. The one or more ribs may attach the anode or the cathode to the anode pan or the cathode pan assembly, respectively. The one or more ribs are perpendicular to the anode pan and/or the cathode pan and the baffle plate is perpendicular to the one or more ribs. Therefore, the baffle plate is parallel to the anode and/or cathode pan. The distance of the baffle plate from the electrode can be increased or decreased. The baffle plate and its various configurations have been described in U.S. Provisional Application No. 63/195,520, filed on Jun. 1, 2021, which is incorporated herein by reference in its entirety in the present disclosure.

As described earlier, at high current densities the electrolyte may be heated to 10-100's of degrees Celsius as it flows through the cell. In addition to the membrane-electrode gap that provides a path for the solution and the gas flow between the electrode (cathode and/or anode) and the membrane and removes the heat generated around the membrane; the baffle plate may further facilitate top to bottom mixing of the gas and the fluids thereby maximizing the convective heat transfer and minimizing the heat buildup and concomitant temperature rise, within the cell. Example 2 describes an example of the membrane-electrode gap configuration with the baffle plate.

In some embodiments, due to the presence of the baffle plate, the gas produced at the electrode may mix with the electrolyte on the electrode side of the baffle plate, resulting in a relatively low density column and defining a riser section. The low density mixture may rise relatively quickly through the riser section. Once above the top of the baffle plate, the gas may disengage and flow out of the compartment, while a fraction of the electrolyte may drop back down the back side of the baffle plate (on the pan side) into the down-corner region, thereby defining a circulation loop. This circulation loop has been illustrated in FIG. 4 with the dashed arrows. The riser section is shown as an upward dashed arrow and the down-comer section is shown as a downward dashed arrow. The baffle plate can be used to create rapidly flowing circulation loops that insure the electrolyte remains substantially isothermal as it flow through the cathode or the anode. Due to the high degree of top-bottom mixing and circulation, rapid thermal equilibration of the inflowing electrolyte can be achieved. Another advantage is that relatively cold liquid can be introduced into the cell which can equilibrate with the warm circulating fluid. The circulation rate (or laps of the recirculation loop during electrolyte transit through the cell) can be anywhere from 1 to 200. The high circulation rate can also drive larger shear rates adjacent to the membrane in the membrane-electrode gap, helping to sweep gas away from the membrane (thereby minimizing hot spots).

Accordingly, in one aspect, there is an electrochemical cell, comprising: an anode, a cathode, a membrane, and a baffle plate, wherein the anode and the membrane and/or the cathode and the membrane are separated by a membrane-electrode gap of between about 0.2-2 mm. In some embodiments, the baffle plate is located between the anode and anode pan, or the cathode and cathode pan, or both. In some embodiments, the cell further comprises one or more spacers in the membrane-electrode gap.

Various configurations and geometries of the spacers have been provided herein and any one of the spacers may be used in the electrochemical cells provided herein.

The geometry or the configuration of the one or more spacers can dictate the membrane-electrode gap(s) (and the fixed gap) between the electrode and the membrane; an unimpeded flow of the liquid and the gas through the cell; and the convective cooling of the electrolyte between the electrode and the membrane. The geometry of the one or more spacers include, but not limited to, number of the one or more spacers, length of the one or more spacers, width of the one or more spacers, design of the one or more spacers, and/or thickness of the one or more spacers. As the increasingly high currents flow through the cell, the geometry or the configuration of the one or more spacers can significantly impact the local Joule heating and avoid membrane damage from local hot spots. Provided herein are the unique spacers that facilitate efficient operation of the electrochemical cells at high current densities.

In some embodiments, the one or more spacers in the membrane-electrode gap in various cell configurations provided herein occupy the membrane-electrode gap completely or partially. In some embodiments, the length of the one or more spacers occupies the entire length of the membrane-electrode gap between the electrode and the membrane or occupies a partial length of the membrane-electrode gap between the electrode and the membrane. In some embodiments, the one or more spacers are in mechanical contact with the anode and the membrane and/or the cathode and the membrane. In some embodiments, the depth or the thickness of the one or more spacers is same as the depth or the thickness of the membrane-electrode gap such that the one or more spacers are sandwiched between the electrode and the membrane. In some embodiments, the one or more spacers are placed in the membrane-electrode gap in such a way that it prevents mechanical contact of the electrode with the membrane yet provides an unimpeded flow of the electrolyte and the gas through the cell around the membrane.

In some embodiments, the one or more spacers are floating in the membrane-electrode gap (or are unconstrained within the membrane-electrode gap) such that the one or more spacers prevent mechanical contact of the electrode with the membrane yet provide an unimpeded flow of the electrolyte and the gas through the cell around the membrane.

In some embodiments, the one or more spacers are made of woven material, knitted material, expanded mesh, extruded mesh, or the like. In some embodiments, the one or more spacers are made of polypropylene (PP), polyethylene (PE), high density polyethylene (HDPE), polyethylene teraphthalate, polyether ether ketone (PEEK), nylon, polytetrafluoroethylene (PTFE), perfluoroalkoxy (PFA), polychlorotrifluoroethylene, ethylene chlorotrifluoroethylene (ECTFE), polyvinylidene fluoride (PVDF), polyvinyl chloride (PVC), ethylene propylene, ethylene propylenediene, neoprene, or urethane.

The one or more spacers that prevent mechanical contact of the electrode with the membrane yet provide an unimpeded flow of the electrolyte and the gas through the cell around the membrane may be of many different configurations.

Figure 5:
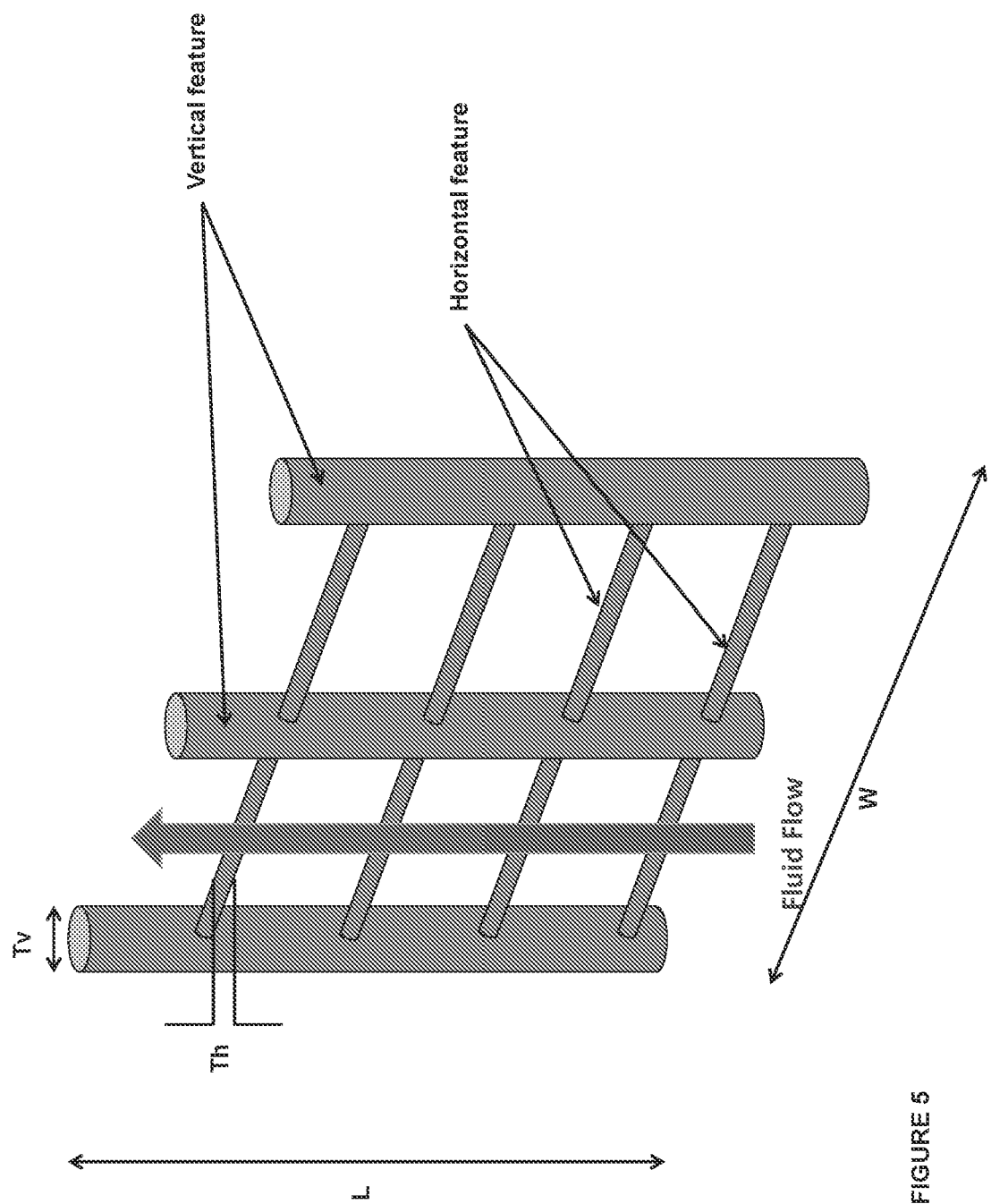
FIG. 5 illustrates some embodiments related to configuration of the one or more spacers.

In some embodiments, the one or more spacers have a vertical feature connected to a horizontal feature wherein thickness of the vertical feature is more than thickness of the horizontal feature. An illustrative example of the spacer with thicker vertical feature than the horizontal feature is as illustrated in FIG. 5. It is to be understood that FIG. 5 is an illustrative example of one such design where the thickness of the vertical feature is more than the thickness of the horizontal feature and is in no way limiting to the scope of the invention. Many such designs can be formed where the thickness of the vertical feature is more than the thickness of the horizontal feature and all are within the scope of the invention.

As illustrated in FIG. 5, the one or more spacers have a vertical feature connected to a horizontal feature where the thickness of the vertical feature (illustrated as Tv in FIG. 5) is more than the thickness of the horizontal feature (illustrated as Th in FIG. 5). In some embodiments, the thickness of the vertical feature dictates the width of the membrane-electrode gap(s) and the relatively thinner horizontal feature allows a path for electrolyte flow and/or gas release between the anode and the membrane and/or the cathode and the membrane. In some embodiments, the vertical feature occupies the membrane-electrode gap(s) completely or partially and the horizontal feature allows a path for electrolyte flow and/or gas release between the anode and the membrane and/or the cathode and the membrane. In some embodiments, the one or more spacers allow the membrane to be thermally isolated from any hot spots formed from the anode and/or the cathode.

Accordingly, in one aspect, there are provided one or more spacers between an electrode and a membrane, the spacer comprising: a vertical feature connected to a horizontal feature wherein thickness of the vertical feature is more than thickness of the horizontal feature, wherein the vertical feature provides a membrane-electrode gap between an electrode and a membrane, wherein the horizontal feature has gaps, and wherein the horizontal feature allows a path for electrolyte flow and/or gas release between the electrode and the membrane. The gaps in the horizontal feature can be of any geometry including but not limited to, holes, mesh, notches, waves, and the like. The gaps, if present, may not be of any specific shape or size. For example, the gaps may be circular, slits, perforations or a mesh. In some embodiments, the geometry of the one or more spacers include, but not limited to, oval geometry, rectangular geometry, circular geometry, hexagonal geometry, and combinations thereof.

In some embodiments, the horizontal feature does not have gaps and the thinner horizontal feature compared to the thicker vertical feature provides sufficient space for the fluid and the gas flow.

In some embodiments, the thickness of the vertical feature in the one or more spacers is between about 0.2-2 mm and the thickness of the horizontal feature in the one or more spacers is between about 0.1-1.5 mm.

In some embodiments, the thickness of the vertical feature in the one or more spacers is between about 0.2-2 mm; or between about 0.2-1.8 mm; or between about 0.2-1.5 mm; or between about 0.2-1.3 mm; or between about 0.2-1 mm; or between about 0.2-0.8 mm; or between about 0.2-0.5 mm; or between about 0.5-2 mm; or between about 0.5-1.8 mm; or between about 0.5-1.5 mm; or between about 0.5-1.3 mm; or between about 0.5-1 mm; or between about 0.5-0.8 mm; or between about 0.8-2 mm; or between about 0.8-1.8 mm; or between about 0.8-1.5 mm; or between about 0.8-1.3 mm; or between about 0.8-1 mm; or between about 1-2 mm; or between about 1-1.8 mm; or between about 1-1.5 mm; or between about 1-1.3 mm; or between about 1.3-2 mm; or between about 1.3-1.8 mm; or between about 1.3-1.5 mm; or between about 1.5-2 mm; or between about 1.5-1.8 mm; or between about 1.8-2 mm; or about 0.8 mm; or about 1 mm; or about 0.5 mm; or 0.8 mm.

In some embodiments, the thickness of the horizontal feature in the one or more spacers is between about 0.1-1.5 mm; or between about 0.1-1.2 mm; or between about 0.1-1 mm; or between about 0.1-0.8 mm; or between about 0.1-0.5 mm; or between about 0.1-0.2 mm; or between about 0.5-1.5 mm; or between about 0.5-1.2 mm; or between about 0.5-1 mm; or between about 0.5-0.8 mm; or between about 0.8-1.5 mm; or between about 0.8-1.2 mm; or between about 0.8-1 mm; or between about 1-1.5 mm; or between about 1-1.2 mm; or between about 1.2-1.5 mm.

In some embodiments, the thickness of the vertical feature in the one or more spacers is between about 0.2-2 mm; or between about 0.2-1.8 mm; or between about 0.2-1.5 mm; or between about 0.2-1.3 mm; or between about 0.2-1 mm, or between about 0.2-0.8 mm; or between about 0.2-0.5 mm; and the thickness of the horizontal feature in the one or more spacers is between about 0.1-1.5 mm; or between about 0.1-1.2 mm; or between about 0.1-1 mm; or between about 0.1-0.8 mm; or between about 0.1-0.5 mm; or between about 0.1-0.2 mm.

In some embodiments, the length of the one or more spacers (illustrated as L in FIG. 5) is between about 0.75-1.5 m; width of the one or more spacers (illustrated as W in FIG. 5) is between about 0.5-3 m; and/or the thickness (or the depth) of the one or more spacers is between about 0.2-2 mm.

In some embodiments, the length of the one or more spacers is between about 0.75-1.5 m; or between about 0.75-1.2 m; or between about 0.75-1 m; or between about 1-1.5 m; or between about 1.25-1.5 m. In some embodiments, the width of the one or more spacers is between about 0.5-3 m; or between about 0.5-2.5 m; or between about 0.5-2 m; or between about 0.5-1.5 m; or between about 0.5-1 m; or between about 1-3 m; or between about 1-2.5 m; or between about 1-2 m; or between about 1-1.5 m; or between about 1.5-3 m; or between about 1.5-2.5 m; or between about 1.5-2 m; or between about 2-3 m; or between about 2-2.5 m; or between about 2.5-3 m. In some embodiments, the thickness of the one or more spacers is between about 0.2-2 mm; or between about 0.2-1.8 mm; or between about 0.2-1.5 mm; or between about 0.2-1.3 mm; or between about 0.2-1 mm; or between about 0.2-0.8 mm; or between about 0.2-0.5 mm; or between about 0.5-2 mm; or between about 0.5-1.8 mm; or between about 0.5-1.5 mm; or between about 0.5-1.3 mm; or between about 0.5-1 mm; or between about 0.5-0.8 mm; or between about 0.8-2 mm; or between about 0.8-1.8 mm; or between about 0.8-1.5 mm; or between about 0.8-1.3 mm; or between about 0.8-1 mm; or between about 1-2 mm; or between about 1-1.8 mm; or between about 1-1.5 mm; or between about 1-1.3 mm; or between about 1.3-2 mm; or between about 1.3-1.8 mm; or between about 1.3-1.5 mm; or between about 1.5-2 mm; or between about 1.5-1.8 mm; or between about 1.8-2 mm; or about 0.8 mm; or about 1 mm; or about 0.5 mm; or 0.8 mm.

In some embodiments of the electrochemical cells or the one or more spacers provided herein, the length of the one or more spacers is between about 0.75-1.5 m; or between about 0.75-1.2 m; or between about 0.75-1 m; or between about 1-1.5 m; or between about 1.25-1.5 m;

the width of the one or more spacers is between about 0.5-3 m; or between about 0.5-2.5 m; or between about 0.5-2 m; or between about 0.5-1.5 m; or between about 0.5-1 m; or between about 1-3 m; or between about 1-2.5 m; or between about 1-2 m; or between about 1-1.5 m; or between about 1.5-3 m; or between about 1.5-2.5 m; or between about 1.5-2 m; or between about 2-3 m; or between about 2-2.5 m; or between about 2.5-3 m; and the thickness of the one or more spacers is between about 0.2-2 mm; or between about 0.2-1.8 mm; or between about 0.2-1.5 mm; or between about 0.2-1.3 mm; or between about 0.2-1 mm; or between about 0.2-0.8 mm; or between about 0.2-0.5 mm; or between about 0.5-2 mm; or between about 0.5-1.8 mm; or between about 0.5-1.5 mm; or between about 0.5-1.3 mm; or between about 0.5-1 mm; or between about 0.5-0.8 mm; or between about 0.8-2 mm; or between about 0.8-1.8 mm; or between about 0.8-1.5 mm; or between about 0.8-1.3 mm; or between about 0.8-1 mm; or between about 1-2 mm; or between about 1-1.8 mm; or between about 1-1.5 mm; or between about 1-1.3 mm; or between about 1.3-2 mm; or between about 1.3-1.8 mm; or between about 1.3-1.5 mm; or between about 1.5-2 mm; or between about 1.5-1.8 mm; or between about 1.8-2 mm; or about 0.8 mm; or about 1 mm; or about 0.5 mm; or 0.8 mm.

In some embodiments of the electrochemical cells or the one or more spacers provided herein as stated above, the number of one or more spacers in the membrane-electrode gap is between 1-3, or between 1-2, or between 2-3, or 1, or 2, or 3.

In embodiments where the electrode is an expanded metal or a mesh, the thickness of each strand is between about 0.5-3 mm; or between about 0.5-2.5 mm; or between about 0.5-2 mm; or between about 0.5-1.5 mm; or between about 0.5-1 mm; or between about 1-3 mm; or between about 1-2.5 mm; or between about 1-2 mm; or between about 1-1.5 mm; or between about 1.5-3 mm; or between about 1.5-2.5 mm; or between about 1.5-2 mm; or between about 2-3 mm; or between about 2.5-3 mm.

In some embodiments, the electrochemical cell disclosed herein operates at high current densities of between about 300 mA/cm$^2$-6000 mA/cm$^2$; or between about 300 mA/cm$^2$-5000 mA/cm$^2$; or between about 300 mA/cm$^2$-4000 mA/cm$^2$; or between about 300 mA/cm$^2$-3000 mA/cm$^2$; or between about 300 mA/cm$^2$-2000 mA/cm$^2$ or between about 300 mA/cm$^2$-1000 mA/cm$^2$; or between about 300 mA/cm$^2$-800 mA/cm$^2$; or between about 300 mA/cm$^2$-600 mA/cm$^2$; or between about 300 mA/cm$^2$-500 mA/cm$^2$; or between about 500 mA/cm$^2$-6000 mA/cm$^2$; or between about 500 mA/cm$^2$-5000 mA/cm$^2$; or between about 500 mA/cm$^2$-4000 mA/cm$^2$; or between about 500 mA/cm$^2$-3000 mA/cm$^2$ or between about 500 mA/cm$^2$-2000 mA/cm$^2$; or between about 500 mA/cm$^2$-1000 mA/cm$^2$; or between about 500 mA/cm$^2$-800 mA/cm$^2$; or between about 500 mA/cm$^2$-600 mA/cm$^2$; or between about 600 mA/cm$^2$-6000 mA/cm$^2$; or between about 600 mA/cm$^2$-5000 mA/cm$^2$; or between about 600 mA/cm$^2$-4000 mA/cm$^2$; or between about 600 mA/cm$^2$-3000 mA/cm$^2$; or between about 600 mA/cm$^2$-2000 mA/cm$^2$; or between about 600 mA/cm$^2$-1000 mA/cm$^2$; or between about 600 mA/cm$^2$-800 mA/cm$^2$; or between about 800 mA/cm$^2$-6000 mA/cm$^2$; or between about 800 mA/cm$^2$-5000 mA/cm$^2$; or between about 800 mA/cm$^2$-4000 mA/cm$^2$; or between about 800 mA/cm$^2$-3000 mA/cm$^2$; or between about 800 mA/cm$^2$-2000 mA/cm$^2$; or between about 800 mA/cm$^2$-1000 mA/cm$^2$; or between about 1000 mA/cm$^2$-600 mA/cm$^2$, or between about 1000 mA/cm$^2$-5000 mA/cm$^2$; or between about 1000 mA/cm$^2$-4000 mA/cm$^2$, or between about 1000 mA/cm$^2$-3000 mA/cm$^2$; or between about 1000 mA/cm$^2$-2000 mA/cm$^2$; or between about 2000 mA/cm$^2$-6000 mA/cm$^2$; or between about 2000 mA/cm$^2$-5000 mA/cm$^2$; or between about 2000 mA/cm$^2$-4000 mA/cm$^2$; or between about 2000 mA/cm$^2$-3000 mA/cm$^2$; or between about 3000 mA/cm$^2$-6000 mA/cm$^2$, or between about 3000 mA/cm$^2$-5000 mA/cm$^2$; or between about 3000 mA/cm$^2$-4000 mA/cm$^2$; or between about 4000 mA/cm$^2$-6000 mA/cm$^2$; or between about 5000 mA/cm$^2$-6000 mA/cm$^2$. In some embodiments, the electrochemical cell disclosed herein, operates at high current densities of between about 300 mA/cm$^2$-3000 mA/cm$^2$ or between about 300 mA/cm$^2$-2000 mA/cm$^2$, or between about 300 mA/cm$^2$-1000 mA/cm$^2$; or between about 300 mA/cm$^2$-800 mA/cm$^2$, or between about 300 mA/cm$^2$-600 mA/cm$^2$; or between about 300 mA/cm$^2$-500 mA/cm$^2$; or between about 300 mA/cm$^2$-400 mA/cm$^2$.

In some embodiments, the electrochemical cell comprises a high flow rate of anolyte or catholyte, respectively, of between about 200-10,000 kg/h; or between about 200-9000 kg/h; or between about 200-8000 kg/h; or between about 200-7000 kg/h; or between about 200-6000 kg/h; or between about 200-5000 kg/h; or between about 200-4000 kg/h; or between about 200-3000 kg/h; or between about 200-2000 kg/h; or between about 200-1000 kg/h or between about 500-10,000 kg/b; or between about 500-9000 kg/h; or between about 500-8000 kg/h; or between about 500-7000 kg/h; or between about 500-6000 kg/h; or between about 500-5000 kg/h; or between about 500-4000 kg/h; or between about 500-3000 kg/h; or between about 500-2000 kg/h; or between about 500-1000 kg/h; or between about 800-10,000 kg/h; or between about 800-9000 kg/h; or between about 800-8000 kg/h; or between about 800-7000 kg/h; or between about 800-6000 kg/h; or between about 800-5000 kg/h; or between about 800-4000 kg/h; or between about 800-3000 kg/h; or between about 800-2000 kg/h; or between about 800-1000 kg/h; or between about 1000-10,000 kg/h; or between about 1000-9000 kg/h; or between about 1000-8000 kg/h; or between about 1000-7000 kg/h; or between about 1000-6000 kg/h; or between about 1000-5000 kg/h; or between about 1000-4000 kg/h; or between about 1000-3000 kg/h; or between about 1000-2000 kg/h; or between about 3000-10,000 kg/h; or between about 3000-9000 kg/h; or between about 3000-8000 kg/h; or between about 3000-7000 kg/h; or between about 3000-6000 kg/h; or between about 3000-5000 kg/h; or between about 5000-10,000 kg/h; or between about 5000-8000 kg/h; or between about 5000-6000 kg/h; or between about 6000-10,000 kg/h; or between about 6000-8000 kg/h; or between about 8000-10,000 kg/h. Examples of the anolyte and/or catholyte include water or water with alkali, such as for example alkali metal hydroxide e.g. NaOH or KOH in water.

In some embodiments, the superficial liquid velocity of the anolyte and/or the catholyte through the membrane-electrode gap is greater than 0.1 m/s or greater than 0.5 m/s or up to 1 m/s.

In some embodiments, the electrochemical cell provided herein is a hydrogen gas producing electrochemical cell.

In one aspect, there is provided a hydrogen gas producing electrochemical cell, comprising: an anode, a cathode, and a membrane, wherein the anode and the membrane and/or the cathode and the membrane are separated by a membrane-electrode gap. In one aspect, there is provided a hydrogen gas producing electrochemical cell, comprising: an anode, a cathode, a membrane, and one or more spacers, wherein the anode and the membrane and/or the cathode and the membrane are separated by a membrane-electrode gap, and wherein the one or more spacers are provided in the membrane-electrode gap. All the aspects of the membrane-electrode gap and/or the one or more spacers have been described herein. In some embodiments of the aforementioned aspects and embodiments, the cell further comprises a baffle plate. In some embodiments, the baffle plate is located between the anode and anode pan, or the cathode and cathode pan, or both.

Various dimensions of the geometry and spacing of the one or more spacers and/or location and the placement of the one or more spacers have all been described herein and can be applied to the aforementioned aspects.

In some embodiments, there is provided an electrolyzer comprising multiplicity of aforementioned aspects of individual electrochemical cells.

The components of the anode and/or cathode pan may be made from an electro conductive material such as, but not limited to, nickel, stainless steel, stainless steel alloys, and the like. The anode and the cathode pans may be made of a conductive metal. The conductive metal includes any conductive metal suitable to be used as an anode pan or the cathode pan.

The electrolyzer may comprise a single cell or a stack of cells connected in series or in parallel. The electrolyzer may be a stack of 5 or 6 or 50 or 100 or 140 or 150 or more electrochemical cells connected in series or in parallel. Each cell comprises the anode, the cathode, the ion exchange membrane, the membrane-electrode gap between the anode and the membrane and/or the cathode and the membrane, and optionally the one or more spacers in the membrane-electrode gap(s).

In some embodiments, the electrolyzers provided herein are monopolar electrolyzers. In the monopolar electrolyzers, the electrodes may be connected in parallel where all anodes and all cathodes are connected in parallel. In some embodiments, the electrolyzers provided herein are bipolar electrolyzers. In the bipolar electrolyzers, the electrodes may be connected in series where all anodes and all cathodes are connected in series. In some embodiments, the electrolyzers are a combination of monopolar and bipolar electrolyzers and may be called hybrid electrolyzers.

In some embodiments of the bipolar electrolyzers as described above, the cells are stacked serially constituting the overall electrolyzer and are electrically connected in two ways. In bipolar electrolyzers, a single plate, called bipolar plate, may serve as base plate for both the cathode and anode. The electrolyte solution may be hydraulically connected through common manifolds and collectors internal to the cell stack. The stack may be compressed externally to seal all frames and plates against each other which are typically referred to as a filter press design. In some embodiments, the bipolar electrolyzer may also be designed as a series of cells, individually sealed, and electrically connected through back-to-back contact, typically known as a single element design. The single element design may also be connected in parallel in which case it would be a monopolar electrolyzer.

In some embodiments, the cell size may be denoted by the active area dimensions. In some embodiments, the active area of the electrolyzers used herein may range from 0.5-1.5 meters tall and 0.25-3 meters wide. The individual compartment thicknesses may range from 2 mm-100 mm.

Examples of electrocatalysts have been described herein and include, but not limited to, highly dispersed metals or alloys of the platinum group metals, such as platinum, palladium, ruthenium, rhodium, iridium, or their combinations such as platinum-rhodium, platinum-ruthenium, or nickel mesh coated with $RuO_2$. The electrodes may be coated with electrocatalysts using processes well known in the art. In some embodiments, the electrodes comprise a high surface area nickel and may not be coated with the electrocatalyst.

In some embodiments, the ion exchange membrane is an anion exchange membrane (for alkaline conditions) or a cation exchange membrane (for acidic conditions). In some embodiments, the cation exchange membranes in the electrochemical cell, as disclosed herein, are conventional and are available from, for example, Asahi Kasei of Tokyo, Japan; or from Membrane International of Glen Rock, N.J., or Chemours, in the USA. Examples of CEM include, but are not limited to, N2030WX (Chemours), F8020/F8080, and F6801 (Aciplex). CEMs that are desirable in the methods and systems herein may have minimal resistance loss, greater than 90% selectivity, and high stability. For example only, a fully quarternized amine containing polymer may be used as an AEM.

Examples of cationic exchange membranes include, but not limited to, cationic membrane consisting of a perfluorinated polymer containing anionic groups, for example sulphonic and/or carboxylic groups. However, it may be appreciated that in some embodiments, depending on the need to restrict or allow migration of a specific cation or an anion species between the electrolytes, a cation exchange membrane that is more restrictive and thus allows migration of one species of cations while restricting the migration of another species of cations may be used. Similarly, in some embodiments, depending on the need to restrict or allow migration of a specific anion species between the electrolytes, an anion exchange membrane that is more restrictive and thus allows migration of one species of anions while restricting the migration of another species of anions may be used. Such restrictive cation exchange membranes and anion exchange membranes are commercially available and can be selected by one ordinarily skilled in the art.

In some embodiments, the membranes may be selected such that they can function in an acidic and/or alkaline electrolytic solution as appropriate. Other desirable characteristics of the membranes include high ion selectivity, low ionic resistance, high burst strength, and high stability in electrolytic solution in a temperature range of room temperature to 150° C. or higher.

In some embodiments, a membrane that is stable in the range of 0° C. to 150° C.; 0° C. to 100° C.; 0° C. to 90° C.; or 0° C. to 80° C.; or 0° C. to 70° C.; or 0° C. to 60° C.; or 0° C. to 50° C.; or 0° C. to 40° C., or 0° C. to 30° C., or higher may be used. For other embodiments, it may be useful to utilize an ion-specific ion exchange membranes that allows migration of one type of ion (cation with CEM, anion with AEM) but not another; or migration of one type of anion and not another, to achieve a desired product or products in an electrolyte.

The ohmic resistance of the membranes may affect the voltage drop across the anode and the cathode, e.g. as the ohmic resistance of the membranes increase, the voltage across the anode and cathode may increase, and vice versa. Membranes that can be used include, but are not limited to, membranes with relatively low ohmic resistance and relatively high ionic mobility; and membranes with relatively high hydration characteristics that increase with temperatures, and thus decreasing the ohmic resistance. By selecting membranes with lower ohmic resistance known in the art, the voltage drop across the anode and the cathode at a specified temperature can be lowered.

The voltage may be applied to the electrochemical cell by any means for applying the current across the anode and the cathode of the electrochemical cell. Such means are well known in the art and include, without limitation, devices, such as, electrical power source, fuel cell, device powered by sun light, device powered by wind, and combination thereof. The type of electrical power source to provide the current can be any power source known to one skilled in the art. For example, in some embodiments, the voltage may be applied by connecting the anodes and the cathodes of the cell to an external direct current (DC) power source. The power source can be an alternating current (AC) rectified into DC. The DC power source may have an adjustable voltage and current to apply a requisite amount of the voltage to the electrochemical cell.

Methods

In some aspects, there are provided methods to make, manufacture, and/or use the electrochemical cells with membrane-electrode gap(s) and fixed gap provided herein.

In one aspect, there is provided a method, comprising: positioning an electrode inside an electrochemical cell; positioning a membrane on top of the electrode, and separating the electrode from the membrane by a membrane-electrode gap. In some embodiments of the aforementioned aspect, the method further comprises separating the anode and the cathode in the electrochemical cell by a fixed gap. In some embodiments of the aforementioned aspect, the membrane-electrode gap is between about 0.2-2 mm or the fixed gap is between about 0.2-4 mm or any of the dimensions of the membrane-electrode gap and the fixed gap provided herein. In some embodiments of the aforementioned aspect and embodiments, the method further comprises providing a path for electrolyte flow and/or gas release through the membrane-electrode gap between the electrode and the membrane, thereby reducing membrane damage due to high heat.

In some embodiments of the aforementioned aspect and embodiments, the electrode is an anode and/or a cathode. In some embodiments of the aforementioned aspect and embodiments, the electrode is a planar electrode or an expanded metal or a mesh. In some embodiments of the aforementioned aspect and embodiments, the membrane is an anion exchange membrane or a cation exchange membrane.

In some embodiments of the aforementioned aspects and embodiments, the method further comprises providing a baffle plate in the cell. In some embodiments, the method comprises positioning a baffle plate between the anode and anode pan, or the cathode and cathode pan, or both. The baffle plate has been described in detail herein.

In some embodiments of the aforementioned aspect and embodiments, the method further comprises providing one or more spacers in the membrane-electrode gap between the electrode and the membrane. In some embodiments of the aforementioned aspect and embodiments, the method further comprises occupying the membrane-electrode gap completely or partially with the one or more spacers. In some embodiments of the aforementioned aspect and embodiments, the method further comprises providing mechanical contact of the one or more spacers with the electrode and/or the membrane. In some embodiments of the aforementioned aspect and embodiments, the method further comprises floating the one or more spacers in the membrane-electrode gap(s). In some embodiments of the aforementioned aspect and embodiments, the method further comprises providing the one or more spacers in form of woven material, knitted material, expanded mesh, extruded mesh or combinations thereof. In some embodiments of the aforementioned aspect and embodiments, the one or more spacers are made of polypropylene (PP), polyethylene (PE), high density polyethylene (HDPE), polyethylene teraphthalate, polyether ether ketone (PEEK), nylon, polytetrafluoroethylene (PTFE), perfluoroalkoxy (PFA), polychlorotrifluoroethylene, ethylene chlorotrifluoroethylene (ECTFE), polyvinylidene fluoride (PVDF), polyvinyl chloride (PVC), ethylene propylene, ethylene propylenediene, neoprene, or urethane.

In some embodiments of the aforementioned aspect and embodiments, the method further comprises providing the one or more spacers with a vertical feature connected to a horizontal feature wherein thickness of the vertical feature is more than thickness of the horizontal feature. In some embodiments of the aforementioned aspect and embodiments, the method further comprises occupying the membrane-electrode gap completely or partially with the vertical feature and allowing a path for electrolyte flow and/or gas release through the horizontal feature between the electrode and the membrane. In some embodiments of the aforementioned aspect and embodiments, the method further comprises using the one or more spacers to allow the membrane to be thermally isolated from any hot spots formed from the electrode.

In some embodiments of the aforementioned aspect and embodiments, the method further comprises providing thickness of the vertical feature to be between about 0.2-2 mm and the thickness of the horizontal feature to be between about 0.1-1.5 mm.

In some embodiments of the aforementioned aspect and embodiments, the method further comprises providing length of the one or more spacers to be between about 0.75-1.5 m; width of the one or more spacers to be between about 0.5-3 m; and/or the thickness of the one or more spacers to be between about 0.2-2 mm.

In some embodiments of the aforementioned aspect and embodiments, the method further comprises providing number of one or more spacers to be between 1-3.

Various combinations of the number, the length, the width, the thickness, or the depth of the one or more spacers provided herein; that minimize the impact of fluctuating and high power dissipation on internal temperature of the cell and prevent membrane erosion and/or fatigue, have all been provided herein. It is to be understood that any of the dimensions of the length, the width, the thickness or the depth of the one or more spacers provided herein as well as the number of the one or more spacers can be combined in order to allow a path for electrolyte flow and/or gas release between the electrode and the membrane and the membrane to be thermally isolated from any hot spots formed from the electrode.

In some embodiments of the aforementioned aspect and embodiments, the method further comprises operating the electrochemical cell under a high flow rate of anolyte or catholyte, respectively, of between about 200-10,000 kg/h. The high flow rates of the anolyte and/or catholyte have been provided herein.

In some embodiments of the aforementioned aspect and embodiments, the method further comprises operating the electrochemical cell at high current densities of between about 300 mA/cm²-6000 mA/cm². Various rages of the high current densities for operating the electrochemical cell have been provided herein.

In some embodiments of the aforementioned aspect and embodiments, the electrochemical cell is hydrogen gas producing cell. In some embodiments of the aforementioned aspect and embodiments, the gas flowing between the anode and the membrane in the membrane-electrode gap (optionally through the one or more spacers) or within the zero gap structure is oxygen gas and the gas flowing between the cathode and the membrane in the membrane-electrode gap (optionally through the one or more spacers) or within the zero gap structure is hydrogen gas.

In some embodiments of the aforementioned aspect and embodiments comprising membrane-electrode gap and optionally one or more spacers in the membrane-electrode gap, the method further comprises preventing membrane damage due to high local temperatures by providing high flow rate of the electrolyte and/or the gas release through the membrane-electrode gap; high shear rate to remove the gas at the electrode; no or minimal mechanical contact of the membrane and the electrode; and cooling of the membrane.

In some embodiments of the foregoing aspects and embodiments, the method further comprises accommodating high flow rate of anolyte or catholyte and/or gas through the membrane-electrode gap (optionally through the one or more spacers) between the anode and/or the cathode and the membrane. The high flow rates of the anolyte and/or catholyte through the anode and cathode have been exemplified herein.

In one aspect, there is provided a process for manufacturing an electrochemical cell, comprising: positioning an electrode inside an electrochemical cell; positioning a membrane on top of the electrode, and providing a membrane-electrode gap between the electrode and the membrane. In some embodiments of the foregoing aspect, the membrane-electrode gap is between about 0.2-2 mm. In some embodiments of the foregoing aspect and embodiments, the process further comprises providing one or more spacers in the membrane-electrode gap. In some embodiments of the foregoing aspect and embodiments, the process further comprises providing the fixed gap between the anode and the cathode in the electrochemical cell wherein the fixed gap is between about 0.2-4 mm.

In some embodiments of the aforementioned aspects and embodiments, the process further comprises providing a baffle plate in the cell. In some embodiments, the process further comprises positioning a baffle plate between the anode and anode pan, or the cathode and cathode pan, or both. The baffle plate has been described in detail herein.

In some embodiments of the foregoing aspect and embodiments, the process further comprises providing the membrane-electrode gap (or the fixed gap) using sealing gaskets, or by placing the electrodes coplanar with the flanges or higher above the flanges.

Typically, each cathode pan may be coupled to an anode pan using sealing gaskets, loading bars, and associated fastener assemblies (bolts, washers, nut, insulating wrap). Both the anode and cathode assemblies are flanged pan structures. Through the dimensional callouts and associated tolerances, the location of the top of each electrode relative to the relevant pan flange may be adjusted.

For instance, in some embodiments, the electrodes are coplanar with the flanges. In that case, gaskets may be added between each pan flange (anode and cathode) and the membrane. The gaskets may compress when the sealing bolts are tightened. So, the membrane-electrode gap between the electrodes and the membrane may correspond to the thicknesses of the compressed gaskets. The fixed gap thickness would correspond to the sum of the two membrane-electrode gaps (between the anode and the membrane and the cathode and the membrane) minus the thickness of the membrane.

In some embodiments, the top of the electrode may be designed to sit higher (or above) the pan flanges, then the membrane-electrode gap thickness may equal the compressed gasket thickness minus the electrode protrusion above the flange. Similarly, the top of the electrode may be designed to sit below the flange, then the membrane-electrode gap thickness may equal the electrode-flange offset plus the thickness of the compressed gasket.

The thickness, the height, the length, and the number of the one or more spacers that prevent membrane damage due to high local temperatures by providing high flow rate of the electrolyte and/or the gas release through the membrane-electrode gap; providing high shear rate to remove the gas at the electrode; providing no or minimal mechanical contact of the membrane and the electrode; and providing cooling of the membrane, have all been provided herein.

In one aspect, there is provided a process for assembling an electrochemical cell, comprising:

assembling an individual electrochemical cell by positioning an anode inside an electrochemical cell; positioning a membrane on top of the anode; providing a membrane-electrode gap between the anode and the membrane wherein the membrane-electrode gap is between about 0.2-2 mm; positioning a cathode on top of the membrane; and providing a zero gap between the cathode and the membrane; or assembling an individual electrochemical cell by positioning an anode inside an electrochemical cell; positioning a membrane on top of the anode; providing a zero gap between the anode and the membrane; positioning a cathode on top of the membrane; and providing a membrane-electrode gap between the cathode and the membrane wherein the membrane-electrode gap is between about 0.2-2 mm; or assembling an individual electrochemical cell by positioning an anode inside an electrochemical cell; positioning a membrane on top of the anode; providing a membrane-electrode gap between the anode and the membrane wherein the membrane-electrode gap is between about 0.2-2 mm; positioning a cathode on top of the membrane; and providing a membrane-electrode gap between the cathode and the membrane wherein the membrane-electrode gap is between about 0.2-2 mm; and supplying the electrochemical cell with feeders for a cell current and an electrolysis feedstock.

In some embodiments of the aforementioned aspect and embodiments, the process further comprises providing a baffle plate in the cell. In some embodiments, the process comprises positioning a baffle plate between the anode and anode pan, or the cathode and cathode pan, or both. The baffle plate has been described in detail herein.

In some embodiments of the aforementioned aspects, the electrochemical cell is hydrogen gas producing cell. The gas flowing between the anode and the membrane is oxygen gas and the gas flowing between the cathode and the membrane is hydrogen gas.

In one aspect, there is provided a process for assembling an electrolyzer, comprising: assembling aforementioned individual electrochemical cells; and placing a plurality of the assembled electrochemical cells side by side in a stack and bracing them together so as to sustain electrical contact between the electrochemical cells.

The following examples are put forth so as to provide those of ordinary skill in the art with a disclosure and description of how to make and/or use the present invention, and are not intended to limit the scope of what the inventors regard as their invention nor are they intended to represent that the experiments below are all or the only experiments performed. Various modifications of the invention in addition to those described herein will become apparent to those skilled in the art from the foregoing description and accompanying figures. Such modifications fall within the scope of the appended claims. Efforts have been made to ensure accuracy with respect to numbers used (e.g. amounts, temperature, etc.) but some experimental errors and deviations should be accounted for. Unless indicated otherwise, parts are parts by weight, molecular weight is weight average molecular weight, temperature is in degrees Centigrade, and pressure is at or near atmospheric.

In the examples and elsewhere, abbreviations have the following meanings:

| | |
|---|---|
| IEM | = ion exchange membrane |
| kgh | = kilogram per hour |
| mA/cm$^2$ | = milliamps/centimeter square |
| m | = meter |
| mm | = millimeter |
| mm$^2$ | = millimeter square |
| m/s | = meter/sec |
| psi | = per square inch |
| um | = micron |

EXAMPLES

Example 1

Flow Through Membrane-Electrode Gap Compared to Zero Gap 2D simulations were conducted for estimating the velocity profiles and phase distributions near the top of a cathode for a 1 mm membrane-electrode gap configuration and a zero gap configuration. The electrode was modeled as a series of 10 mm high×1.5 mm thick segments, with each segment separated by a 10 mm high opening. In an operating cell, a membrane (not modeled) would contact the electrode (in the zero gap configuration), or be located adjacent to the 1 mm membrane-electrode gap (in a fixed gap configuration).

The vertical velocity component was found to be relatively large (~0.3-0.7 m/s) adjacent to the membrane within a cell with a 1 mm gap. Conversely, the vertical velocity component adjacent to the membrane was found to be essentially 0 in the zero gap configuration. The higher is the velocity adjacent to the membrane and the electrode (or in the membrane-electrode gap), the more effective is the flow at sweeping gas off of the surfaces and removing heat from the assembly.

Example 2

Figure 6:
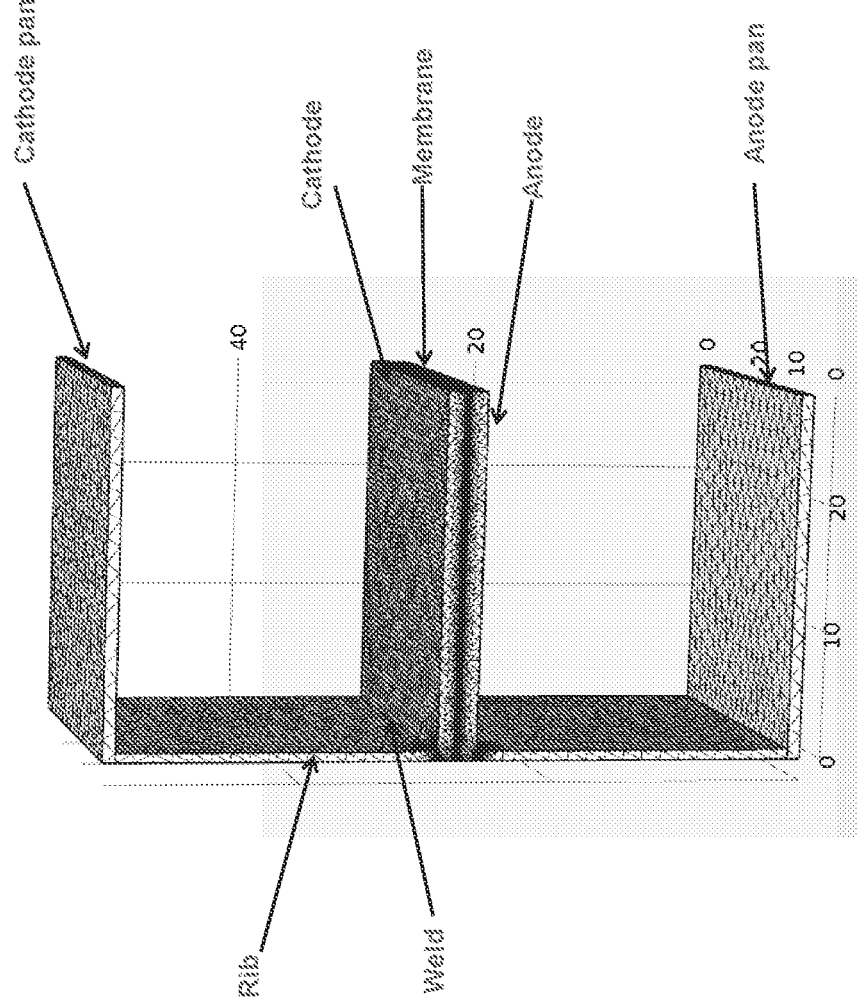
FIG. 6 illustrates a simulated model described in Example 2 herein.

Temperature Distribution Through the Membrane and Enhanced Cooling in the Membrane-Electrode Gap Configuration A simulation of the joule heating within a section of a cell stacked as shown in FIG. 6 was conducted. FIG. 6 is a model of 2 mm fixed gap configuration with 1 mm membrane-electrode gaps on both sides of membrane. A normal current density was assigned to the anode pan and the cathode pan was assumed to be at ground potential. Current flow was: anode pan-current rib-weld-anode-membrane-cathodeweld-current rib-cathode pan in the zero gap configuration; and anode pan-current rib-weld-anode-membrane-electrode gap-membrane-membrane-electrode gap-cathode-weld-current rib-cathode pan in the fixed gap configuration with membrane-electrode gaps on both sides of the membrane. Welds were assumed to be 100 um thick. A convective heat transfer coefficient was assigned to the internal surfaces, and the inlet temperature of the internal fluid (KOH) fluid was assigned various values. The convective heat transfer coefficient is a function of the local fluid velocity. The velocity and phase distributions were simulated using Fluent CFD software. The temperature distribution through the modeled structure was calculated as a function of the current density applied to the electrode.

Two configurations were considered: zero gap configuration with baffle plate; and 2 mm fixed gap, with 1 mm membrane-electrode gaps on both sides of the membrane (with a baffle plate).

Figure 7:
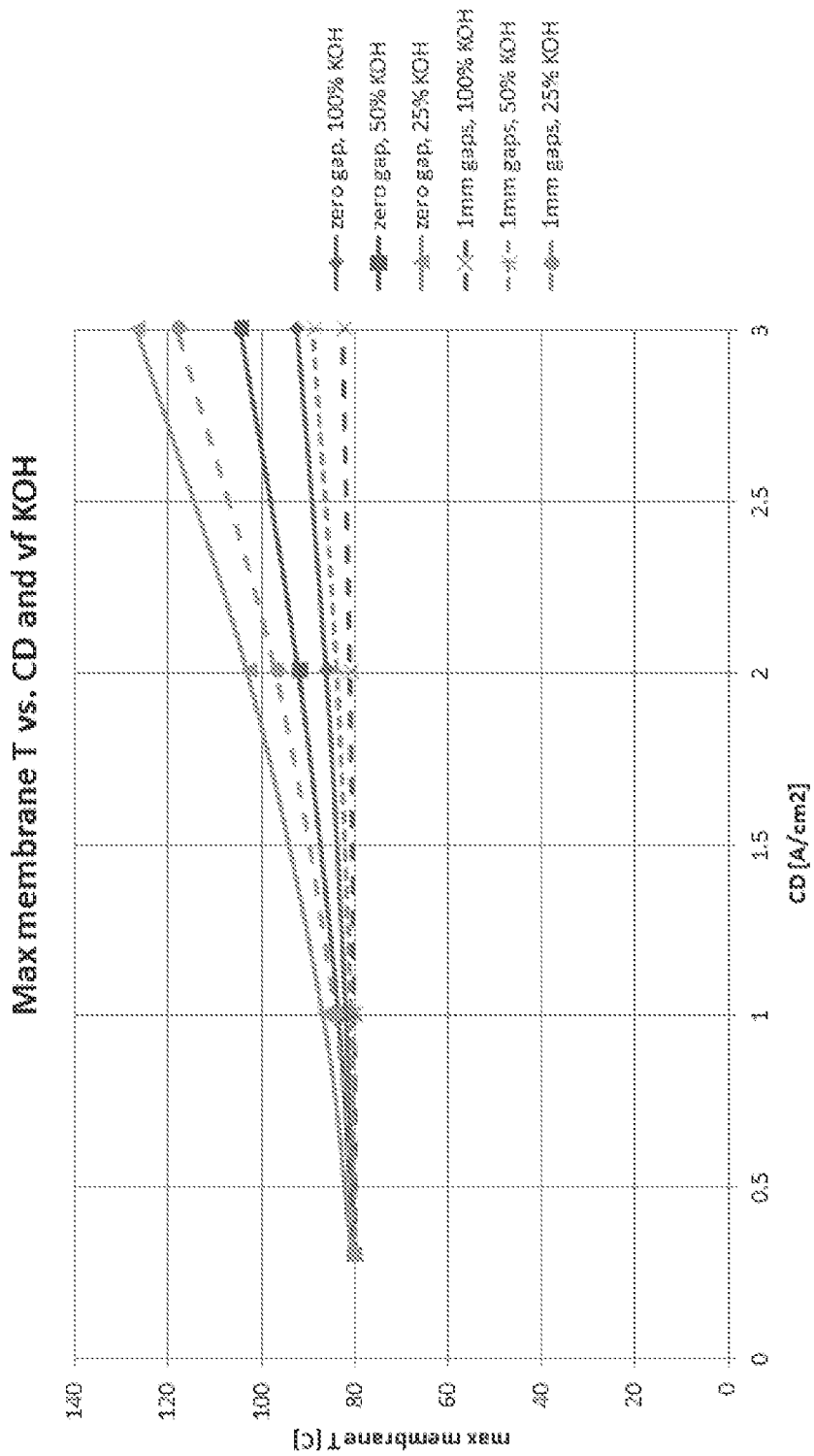
FIG. 7 illustrates temperature vs current density (CD) data obtained using a simulated model as described in Example 2 herein.

In both cases, the maximum temperature was located within the membrane. FIG. 7 shows reduced maximum membrane temperature within 2 mm fixed gap configuration (2×1 mm membrane-electrode gaps) vis-à-vis within a zero gap configuration across a wide range of liquid KOH volume fractions (vf). As evident in FIG. 7, increasing the flow adjacent to the electrode/membrane through the incorporation of 1 mm membrane-electrode gaps improves heat transfer and reduces the temperature at the membrane.

Example 3

Fixed Gap Configurations with or without the Spacers

Various configurations of the fixed gap in the cell are as follows.

Through maintaining a cell to cell seal (gasket or PTFE gasket tape) thickness to within about 0.1 mm from cell assembly to cell assembly by controlling the sealing load (e.g., through use of a torque wrench), and by reproducibly locating the heights of the electrodes relative to the anode and cathode pan flanges to within about +/−0.3 mm, achieve a targeted membrane-electrode separation and therefore a specific fixed gap, within +/−0.7 mm (2×0.3 mm+0.1 mm).

For targeting a nominal 2 mm fixed gap, due to standard assembly tolerances as described above, the fixed gap can vary between about 1.3 mm and 2.7 mm. The maximum sum of the spacer thicknesses may be less than 1.3 mm in order to avoid squeezing the spacer(s) between the electrodes and the membranes. If equal thickness spacers are used on both sides of the membrane (in the membrane-electrode gaps), the spacers may be less than or equal to 0.65 mm thick. If the pressure in both half-shells is balanced, there may be equal membrane-electrode gaps of between 0.65 mm and 1.35 mm on both sides of the membrane. In that case, both spacers may be floating within their respective membrane-electrode gaps, and the gaps may not vary much across the active area.

When the cell is operated with a positive pressure on the cathode side of the membrane, the membrane may be driven into contact with the anode-side spacer in the membrane-anode gap, which may contact the anode. The gap between the anode and the membrane may equal the thickness of the spacer (e.g., 0.65 mm), and the gap between the membrane and the cathode may now be between about 0.65 mm-2.05 mm.

Although the foregoing invention has been described in some detail by way of illustration and example for purposes of clarity of understanding, it should be readily apparent to those of ordinary skill in the art in light of the teachings of this invention that certain changes and modifications may be made thereto without departing from the spirit or scope of the appended claims. Accordingly, the preceding merely illustrates the principles of the invention. It will be appreciated that those skilled in the art will be able to devise various arrangements, which, although not explicitly described or shown herein, embody the principles of the invention, and are included within its spirit and scope. Furthermore, all examples and conditional language recited herein are principally intended to aid the reader in understanding the principles of the invention and the concepts contributed by the inventors to furthering the art and are to be construed as being without limitation to such specifically recited examples and conditions. Moreover, all statements herein reciting principles, aspects, and embodiments of the invention as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. The scope of the invention, therefore, is not intended to be limited to the exemplary embodiments shown and described herein. It is intended that the following claims define the scope of the invention and that methods and structures within the scope of these claims and their equivalents be covered thereby.

What is claimed is:

1. An electrochemical cell, comprising:
  a first electrode;
  a membrane disposed adjacent to the electrode, wherein the first electrode and the membrane are separated by a first membrane-electrode gap; and
  one or more first spacers disposed in the first membrane-electrode gap between the first electrode and the membrane,
  wherein the one or more first spacers comprise one or more first features extending in a first direction and one or more second features extending in a second direction, wherein the first direction is different from the second direction, and wherein a thickness of at least a portion of the one or more first features is greater than a corresponding thickness of at least a corresponding portion of the one more second features to form one or more pathways for flow of electrolyte or gas or both through the one or more spacers.

2. The electrochemical cell of claim 1, wherein the first membrane-electrode gap is from about 0.2 mm to about 2 mm.

3. The electrochemical cell of claim 1, further comprising a second electrode disposed adjacent to an opposite side of the membrane from the first electrode, wherein the first electrode and the second electrode are separated by a fixed gap of from about 0.2 mm to about 4 mm.

4. The electrochemical cell of claim 3, further comprising one or more second spacers disposed in a second membrane-electrode gap between the second electrode and the membrane.

5. The electrochemical cell of claim 4, wherein the one or more second spacers are in direct contact with the second electrode and the membrane.

6. The electrochemical cell of claim 1, wherein the first electrode is a planar electrode or an expanded metal or a mesh and the membrane is an anion exchange membrane or a cation exchange membrane.

7. The electrochemical cell of claim 1, wherein the one or more first spacers occupy the first membrane-electrode gap partially.

8. The electrochemical cell of claim 1, wherein the one or more first spacers are in direct contact with the first electrode and the membrane.

9. The electrochemical cell of claim 1, wherein the one or more first spacers are floating in the membrane-electrode gap.

10. The electrochemical cell of claim 1, wherein the one or more first spacers are a woven material, a knitted material, an expanded mesh, or an extruded mesh.

11. The electrochemical cell of claim 1, wherein the one or more first spacers are made of polypropylene (PP), polyethylene (PE), high density polyethylene (HDPE), polyethylene teraphthalate, polyether ether ketone (PEEK), nylon, polytetrafluoroethylene (PTFE), perfluoroalkoxy (PFA), polychlorotrifluoroethylene, ethylene chlorotrifluoroethylene (ECTFE), polyvinylidene fluoride (PVDF), polyvinyl chloride (PVC), ethylene propylene, ethylene propylenediene, neoprene, or urethane.

12. The electrochemical cell of claim 1, wherein the first direction is transverse to the second direction.

13. A method comprising:
    positioning a first electrode inside an electrochemical cell;
    positioning a membrane adjacent to the first electrode;
    separating the first electrode from the membrane by a first membrane-electrode gap; and
    positioning one or more first spacers in the first membrane-electrode gap between the first electrode and the membrane, wherein the one or more first spacers comprise one or more first features extending in a first direction and one or more second features extending in a second direction, wherein the first direction is different from the second direction, and wherein a thickness of at least a portion of the one or more first features is greater than a corresponding thickness of at least a corresponding portion of the one or more second features to form one or more pathways for flow of electrolyte or gas or both through the one or more spacers.

14. The method of claim 13, wherein the first membrane-electrode gap is from about 0.2 mm to about 2 mm.

15. The method of claim 13, further comprising positioning a second electrode adjacent to an opposite side of the membrane from the first electrode.

16. The method of claim 15, further comprising operating the electrochemical cell at a specified cell current density to produce hydrogen gas at the first electrode or at the second electrode.

17. The method of claim 15, further comprising positioning one or more second spacers in a second membrane-electrode gap between the second electrode and the membrane.

18. The method of claim 17, wherein positioning the one or more second spacers comprises placing the one or more second spacers in direct contact with the second electrode and the membrane.

19. The method of claim 13, wherein positioning the one or more first spacers comprises placing the one or more first spacers in direct contact with the first electrode and the membrane.

20. The method of claim 13, further comprising flowing an electrolyte through the pathways of the one or more spacers.

21. The method of claim 13, wherein the first direction is transverse to the second direction.

* * * * *